United States Patent
Kempf et al.

(10) Patent No.: US 9,497,661 B2
(45) Date of Patent: *Nov. 15, 2016

(54) IMPLEMENTING EPC IN A CLOUD COMPUTER WITH OPENFLOW DATA PLANE

(71) Applicant: Telefonaktiebolaget L M Ericsson (publ), Stockholm (SE)

(72) Inventors: James Kempf, Mountain View, CA (US); Bengt E. Johansson, Västra Frölunda (SE); Sten Pettersson, Torslanda (SE); Tord K. Nilsson, Bohus-Björkö (SE); Harald Lüning, Göteborg (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,896

(22) Filed: Sep. 15, 2014

(65) Prior Publication Data

US 2015/0071053 A1    Mar. 12, 2015

Related U.S. Application Data

(63) Continuation of application No. 13/536,838, filed on Jun. 28, 2012, now Pat. No. 8,867,361, which is a continuation-in-part of application No. 13/113,727, filed on May 23, 2011, now Pat. No. 8,873,398.

(60) Provisional application No. 61/617,597, filed on Mar. 29, 2012.

(51) Int. Cl.
*H04W 28/02* (2009.01)
*H04W 24/02* (2009.01)
(Continued)

(52) U.S. Cl.
CPC ...... *H04W 28/0268* (2013.01); *H04L 41/0695* (2013.01); *H04L 43/0882* (2013.01);
(Continued)

(58) Field of Classification Search
CPC . H04L 45/306; H04L 45/64; H04L 45/7453; H04L 67/1076; H04L 67/18; H04L 12/4633; H04L 12/4666; H04L 45/50; H04L 47/781; H04L 47/825; H04L 67/10; H04W 24/02; H04W 24/00; H04W 76/022
See application file for complete search history.

(56) References Cited

U.S. PATENT DOCUMENTS 7,937,438 B1    5/2011    Miller et al.
7,953,865 B1    5/2011    Miller et al.
(Continued)

FOREIGN PATENT DOCUMENTS

WO    WO-2010099513    9/2010

OTHER PUBLICATIONS

Open Flow_1_1: http://openflow.org/documents/openflow_1.1-allmerged-draft2.pdf; Oct. 23, 2010, 67 pages.
(Continued)

*Primary Examiner* — Un C Cho
*Assistant Examiner* — Oussama Roudani
(74) *Attorney, Agent, or Firm* — Nicholson, De Vos, Webster & Elliot, LLP

(57) ABSTRACT

A method implements a control plane of an evolved packet core (EPC) of a long term evolution (LTE) network in a cloud computing system. A cloud manager monitors resource utilization of each control plane module and the control plane traffic handled by each control plane module. The cloud manager detects a threshold level of resource utilization or traffic load for one of the plurality of control plane modules of the EPC. A new control plane module is initialized as a separate virtual machine by the cloud manager in response to detecting the threshold level. The new control plane module signals the plurality of network elements in the data plane to establish flow rules and actions to establish differential routing of flows in the data plane using the control protocol, wherein flow matches are encoded using an extensible match structure in which the flow match is encoded as a type-length-value (TLV).

19 Claims, 19 Drawing Sheets

(51) Int. Cl.
*H04W 24/04* (2009.01)
*H04L 12/24* (2006.01)
*H04L 12/26* (2006.01)
*H04L 12/851* (2013.01)
*H04W 88/12* (2009.01)

(52) U.S. Cl.
CPC .......... *H04L43/16* (2013.01); *H04L 47/2441* (2013.01); *H04W 24/02* (2013.01); *H04W 24/04* (2013.01); *H04W 88/12* (2013.01)

(56) References Cited

U.S. PATENT DOCUMENTS

| | | | |
|---|---|---|---|
| 7,991,859 | B1 | 8/2011 | Miller et al. |
| 8,762,501 | B2 | 6/2014 | Kempf et al. |
| 8,867,361 | B2* | 10/2014 | Kempf ............... H04W 24/02 370/216 |
| 8,873,398 | B2* | 10/2014 | Kempf ............... H04W 24/02 370/216 |
| 9,167,501 | B2 | 10/2015 | Kempf et al. |
| 2002/0006114 | A1 | 1/2002 | Bjelland et al. |
| 2003/0030662 | A1 | 2/2003 | Poisson et al. |
| 2003/0043786 | A1 | 3/2003 | Kall et al. |
| 2003/0126435 | A1 | 7/2003 | Mizell et al. |
| 2005/0018637 | A1 | 1/2005 | Karoubalis et al. |
| 2005/0059398 | A1 | 3/2005 | Jaupitre et al. |
| 2005/0270992 | A1 | 12/2005 | Sanzgiri et al. |
| 2009/0138577 | A1 | 5/2009 | Casado et al. |
| 2009/0175215 | A1 | 7/2009 | Chen et al. |
| 2009/0213784 | A1 | 8/2009 | Ang |
| 2010/0135255 | A1 | 6/2010 | Zhang et al. |
| 2010/0220622 | A1* | 9/2010 | Wei ............... H04L 41/0896 370/252 |
| 2010/0257263 | A1 | 10/2010 | Casado et al. |
| 2011/0004913 | A1 | 1/2011 | Nagarajan et al. |
| 2011/0082941 | A1 | 4/2011 | Kim et al. |
| 2011/0225282 | A1 | 9/2011 | Hahm et al. |
| 2011/0231545 | A1 | 9/2011 | Enomoto et al. |
| 2011/0289134 | A1* | 11/2011 | de los Reyes ........ H04L 63/20 709/203 |
| 2011/0299537 | A1 | 12/2011 | Saraiya et al. |
| 2011/0317559 | A1 | 12/2011 | Kern et al. |
| 2012/0221700 | A1* | 8/2012 | Dutta ............... H04L 43/0817 709/223 |
| 2014/0078988 | A1 | 3/2014 | Kant et al. |

OTHER PUBLICATIONS

General Packet Radio Service (GPRS) enhancements for Evolved Universal Terrestrial Radio Access Network (E-UTRAN access) Release 9; ETSI TS 123401, v.92.0; Oct. 2009, 247 pages.
Black, et al; *Per Hop Behavior Identification Codes*; http://www.rfc-editor.org/rfc/rfc3140.txt; Jul 28, 2011; 8 pages.
IEEE Standard for Local and metropolitan area networks; *Media Access Control (MAC) Bridges; IEEE Std 802.1D*; Jun. 9, 2004; 281 pages.
3GPP TS 23.228; 3rd Generation Partnership Project; Technical Specification Group Services and System Aspects; *IP Multimedia Subsystem; Stage 2*; Jun. 2004; 178 pages.
Ekstrom; "QoS Control in the 3GPP Evolved Packet System", *IEEE Communications Magazine*. pp. 76-83, Feb. 2009.
3GPP TS 29.281 "*General Packet Radio System (GPRS) Tunneling Protocol User Plane (GTPy1-U)*", Release 9; Jun. 2010, 26 pages.
Wood, T.; et al., "The Case for Enterprise Ready Virtual Private Clouds," *Usenix HotCloud* 09, http://www.usenix.org/event/hotcloud09/tech/full_papers/wood.pdf, 5 pages.
Openflow Switch Specification; Version 0.8.9; http://www.openflowswitch.org/wk/index.php/Config_Protocol_Draft_Proposal; Dec. 2, 2008, 33 pages.
Menezes, A., et al. "handbook of Applied Cryptography," *CRC Press*, Boca Raton, 1997;Chapter 9, pp. 321-383.

"*IP Multimedia Subsystem (IMS); Stage 2*", 3GPP, TS, 23.228, Release 9, 2010, 250 pages.
"*Evolved General Packet RAdio Service (GPRS) Tunneling Protocol for Control Plane (GTPv2-C)*", 3GPP TS 29.274, 2010.
Non-Final Office Action, U.S. Appl. No. 13/220,471, dated Jan. 16, 2013, 19 pages.
Non-Final Office Action for U.S. Appl. No. 13/113,727, mailed Apr. 24, 2013, 19 pages.
Non-Final Office Action, U.S. Appl. No. 13/220,471, dated Jul. 29, 2013, 16 pages.
Final Office Action for U.S. Appl. No. 13/113,727, mailed Oct. 21, 2013, 19 pages.
3GPP TS 23.402, "3rd Generation Partnership Project; Technical Specification Group Services and System Aspects; *Architecture enhancements for non-3GPP accesses (Release 10)*," Mar. 2011, 227 pages, V10.3.0, 3GPP.
Non-Final Office Action, U.S. Appl. No. 13/536,838, dated Dec. 31, 2013, 28 pages.
Non-Final Office Action, U.S. Appl. No. 13/113,727, dated Dec. 31, 2013, 20 pages.
Notice of Allowance, U.S. Appl. No. 13/220,471, dated Feb. 10, 2014, 16 pages.
Notice of Allowance, U.S. Appl. No. 13/536,838, dated Jun. 20, 2014, 14 pages.
Notice of Allowance, U.S. Appl. No. 13/113,727, dated Jun. 20, 2014, 14 pages.
"Architecture Enhancements for Non-3GPP Accesses", (Mar. 2011), *ETSI TS 123 402 V10.3.0*, (Mar. 2011), 1-228.
"OpenFlow MPLS Implementation", *OpenFlow Wiki*, (Aug. 2010), pp. 1-11.
"OpenFlow Switch Specification version", Dec. 5, 2011; XP055073743; URL:https://www.opennetworking.org/images/stories/downloads/sdn-rescources/onf-specifications/openflow/openflow-spec-v1.2.pdf; 82 pages.
"Universal Mobile Telecommunications System (UMTS); LTE; Network sharing: Architecutre and functional description (3GPP TS 23.251 version 10.1.0 Release 10", *Technical Specification European Telecommunications Standards Institute (ETSI)* 650, Route Des Lucioles; F-06921 Sophia-Antipolis, France vol. 3GPP SA 2t No. V10.1.0 Mar. 1, 2011 (Mar. 1, 2011).
Baliga, et al., "VPMN—Virtual Private Mobile Network Towards Mobility-as-a-Service", *MCS '11*, Jun. 28, 2011 (Jun. 28, 2011).
Baliga, Arati , et al., "VPMN—Virtual Private Mobile Network Towards Mobility-as-a-Service", Jun. 28, 2011; pp. 7-11; XP055035013; Bethesda MD; p. 7 last paragraph, p. 9 last paragraph.
Gouveia, Fabricio , et al., "Cloud Computing and EPC/IMS Integration: New Value-Added Services on Demand", (Sep. 2009), pp. 1-5.
Hideyuki, Shimonishi , et al., "Virtualized Network Infrastructure using OpenFlow", *System Platforms Research Laboratories, NEC Corporation*, (2010), pp. 74-79.
Kempf, J. , et al., "Openflow MPLS and the Open Source Label Switched Router", *Proceedings of the International Teletraffic Conference, IEEE*, Sep. 2011.
McKeown, Nick , et al., "OpenFlow: Enabling Innovation in Campus Networks", *ACM SIGCOMM Computer Communication Review*; vol. 38, No. 2, Apr. 2008; pp. 69-74.
Nurmi, Daniel , et al., "The Eucalyptus Open-source Cloud-computing System", *Proceedings of Cloud Computing and Applications*, 2008.
Shimonishi, Hideyuki , et al., "Virtualized network infrastructure using OpenFlow", *Network Operations and Management Symposium Workshops (NOMS WKSPS)*; Apr. 19, 2010; pp. 74-79.
Doria, A. , et al., "Forwarding and Control Element Separation (ForCES) Protocol Specification", Mar. 2010, 124 pages, *Internet Engineering Task Force (IETF)*, Request for Comments: 5810.
Halpern, J. , et al., "Forwarding and Control Element Separation (ForCES) Forwarding Element Model", Mar. 2010, 124 pages, *Internet Engineering Task Force (IETF)*, Request for Comments: 5812.
Supplemental Notice of Allowance, U.S. Appl. No. 13/536,838, dated Sep. 22, 2014, 4 pages.

(56) References Cited

OTHER PUBLICATIONS

Notice of Allowance, U.S. Appl. No. 14/270,182, dated May 6, 2015, 17 pages.
Notice of Allowance, U.S. Appl. No. 14/270,182, dated Sep. 9, 2015, 9 pages.
Ali, et al., "Node-IDS Based Resource Reservation Protocol (RSVP) Hello: A Clarification Statement", Network Working Group; RFC 4558; Jun. 2006; 7 pages.
Andersson, et al., "LDP Specification", Network Working Group, Request for Comments: 5036, Oct. 2007, 135 pages.
Awduche, et al., "RSVP-TE: Extensions to RSVP for LSP Tunnels", Network Working Group Request for Comments: 3209, Dec. 2001, 61 pgs.
Babiarz, et al., "Configuration Guidelines for DiffServ Service Classes", Network Working Group, Request for Comments: 4594, The Internet Society, Aug. 2006, 57 pages.
Baker, "A Differentiated Services Code Point (DSCP) for Capacity-Admitted Traffic", Internet Engineering Task Force (IETF), Request for Comments: 5865, IETF Trust, May 2010, 14 pages.
Baker, et al., "Management Information Base for the Differentiated Services Architecture", Network Working Group, Request for Comments: 3289, The Internet Society, May 2002, 116 pages.
Berger, "Generalized Multi-Protocol Label Switching (GMPLS) Signaling Resource Reservation Protocol-Traffic Engineering (RSVP-TE) Extensions", Network Working Group, Request for Comments: 3473, Jan. 2003, 42 pages.
Bernet, et al., "An Informal Management Model for Diffserv Routers", Network Working Group, Request for Comments: 3290, The Internet Society, May 2002, 56 pages.
Black, "Differentiated Services and Tunnels", Network Working Group, Request for Comments: 2983, The Internet Society, Oct. 2000, 14 pages.
Blake, et al., "An Architecture for Differentiated Services", Network Working Group, Request for Comments 2475, The Internet Society, Dec. 1998, 36 pages.
Borman, et al., "IPv6 Tumbograms", Network Working Group, Request for Comments: 2675, Aug. 1999, 9 pages.
Braden, et al., "Resource ReSerVation Protocol (RSVP) Version 1 Functional Specification", Network Working Group Request for Comments: 2205, Sep. 1997, 112 pages.
Chan, et al., "Differentiated Services Quality of Service Policy Information Base", Network Working Group, Request for Comments: 3317, The Internet Society, Mar. 2003, 96 pages.
Charny, et al., "Supplemental Information for the New Definition of the EF PHB (Expedited Forwarding Per-Hop Behavior)", Network Working Group, Request for Comments: 3247, The Internet Society, Mar. 2002 24 pages.
Davie, et al., "An Expedited Forwarding PHB (Per-Hop Behavior)", Network Working Group, Request for Comments: 3246, The Internet Society, Mar. 2002, 16 pages.
Deering, et al., "Internet Protocol", IETF RFC 2460, version 6 (IPv6) Specification, Dec. 1998, 37 pages.
Eggert, et al., "Unicast UDP Usage Guidelines for Application Designers", Network Working Group, Request for Comments: 5405, IETF Trust, Nov. 2008, 27 pages.
Fenner, et al., "Management Information Base for the User Datagram Protocol (UDP)", Network Working Group, Request for Comments: 4113, The Internet Society, Jun. 2005, 19 pages.
Grossman, "New Terminology and Clarifications for Diffserv", Network Working Group, Request for Comments: 3260, The Internet Society, Apr. 2002, 10 pages.
Hedrick, "Routing Information Protocol", Network Working Group, Request for Comments: 1058, Jun. 1988, 33 pages.

Heinanen, et al., "Assured Forwarding PHB Group", Network Working Group, Request for Comments: 2597, The Internet Society, Jun. 1999, 11 pages.
Hopps, "Analysis of an Equal-Cost Multi-Path Algorithm", Network Working Group, Request for Comments: 2992, The Internet Society, Nov. 2000, 8 pages.
Housley, "Using Advanced Encryption Standard (AES) CCM Mode with IPsec Encapsulating Security Payload (ESP)," Network Working Group, Request for Comments: 4309, The Internet Society, Dec. 2005, 13 pages.
Kent, et al., "Security Architecture for the Internet Protocol," Network Working Group, Request for Comments: 4301 The Internet Society, Dec. 2005, 101 pages.
Kompella, et al., "Procedures for Modifying the Resource reSerVation Protocol (RSVP)", Network Working Group; RFC 3936; Oct. 2004; 7 pages.
Malkin, "RIP Version 2", Network Working Group, Request for Comments: 2453, Nov. 1998, 39 pages.
Malkin, et al., "RIPng for IPv6", Network Working Group, RFC 2080, Jan. 1997, 19 pages.
Moy, "OSPF Version 2", Network Working Group, Request for Comments: 2328, Apr. 1998, 244 pages.
Nichols, et al., "Definition of Differentiated Services Per Domain Behaviors and Rules for their Specification", Network Working Group Request for Comments: 3086, The Internet Society, Apr. 2001, 24 pages.
Nichols, et al., "Definition of the Differentiated Services Field (DS Field) in the IPv4 and IPv6 Headers", Network Working Group, RFC 2474, Dec. 1998, 20 pages.
Oran, "OSI ISIS Intra-domain Routing Protocol", Network Working Group Request for Comments: 1142, Feb. 1990, 157 pages.
Polk, et al., "A Resource Reservation Protocol (RSVP) Extension for the Reduction of Bandwidth of a Reservation Flow", Network Working Group, RFC 4495, May 2006, 21 pages.
Postel, "Transmission Control Protocol, Darpa Internet Program, Protocol Specification", RFC 793, Information Sciences Institute, University of Southern California, Sep. 1981, 91 pages.
Postel, "User Datagram Protocol", RFC 768, Aug. 28, 1980, 3 pages.
Rekhter, et al., "A Border Gateway Protocol 4 (BGP-4)", Network Working Group, Request for Comments: 4271, Jan. 2006, 104 pages.
Rosen, et al., "BGP/MPLS IP Virtual Private Networks (VPNs)", Network Working Group, Request for Comments: 4364, The Internet Society, Feb. 2006, 47 pages.
Shenker, et al., "Specification of Guaranteed Quality of Service", Network Working Group, Request for Comments: 2212, Sep. 1997, 20 pages.
Socolofsky, et al., "A TCP/IP Tutorial", Network Working Group, Request for Comments: 1180, Jan. 1991, 28 pages.
Thaler, et al., "Multipath Issues in Unicast and Multicast Next-Hop Selection", Network Working Group, Request for Comments: 2991, The Internet Society, Nov. 2000, 9 pages.
Wroclawski, "Specification of the Controlled-Load Network Element Service", Network Working Group, Request for Comments: 2211, Sep. 1997, 19 pages.
Wroclawski, "The Use of RSVP with IETF Integrated Services", Network Working Group, Request for Comments: 2210, Sep. 1997, 33 pages.
Kempf, et al., "Moving the Mobile Evolved Packet Core to the Cloud," Wireless and Mobile Computing, Networking and Communications (WiMob), 2012 IEEE 8th International Conference on, Oct. 8-10, 2012, pp. 784-791.

* cited by examiner

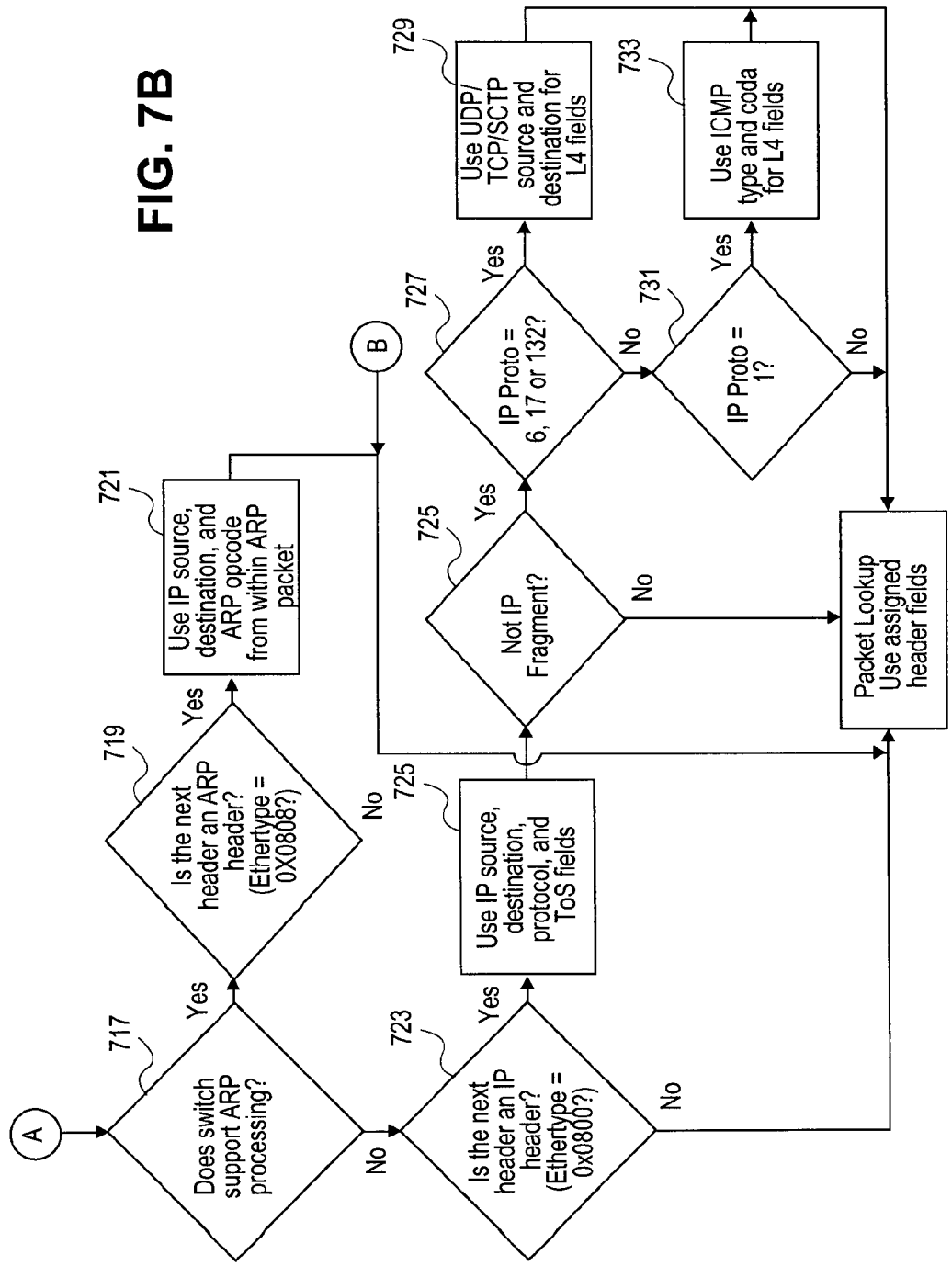

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | E | S | PN |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet) | | | | | | | |
| 10 | Sequence Number (2nd Octet) | | | | | | | |
| 11 | N-PDU Number | | | | | | | |
| 12 | Next Extension Header Type | | | | | | | |

NOTE 0: (*) This bit is a spare bit. It shall be sent as '0'. The receiver shl not evaluate this bit,
NOTE 1: 1) This field shall only be evaluated when indicated by the S flag set to 1.
NOTE 2: 2) This field shall only be evaluated when indicated by the PN flag set to 1.
NOTE 3: 3) This field shall only be evaluated when indicated by the E flag set to 1.
NOTE 4: 4) This field shall be present if and only if any one or more of the S, PN and E flags are set.

FIG. 10

| |
|---|
| Ingress Port |
| Metadata |
| Ether src |
| Ether dst |
| Ether type |
| VLAN id |
| VLAN priority |
| MPLS label |
| MPLS traffic class |
| IP src |
| IP dst |
| IP proto / ARP opcode |
| IP ToS bits |
| TCP / UDP / SCTP src port ICMP Type |
| TCP / UDP / SCTP dst port ICMP Code |
| 2 byte GTP header flags field |
| 4 byte GTP TEID |

FIG. 17

| TEID | VLAN tags (if any) | MPLS labels (if any) | Tunnel Origin Src IP Address | Tunnel End Dest IP Address | QoS DSCP Marking (if any) |
|---|---|---|---|---|---|
| 16 bits | variable | variable | 32 bits | 32 bits | 6 bits |

FIG. 18

| oxm_class | oxm_field | HM | oxm_length |
|---|---|---|---|
| 31     16 | 15    9 | 8   7 | 0 |

OXM TLV Match Header

FIG. 19

IMPLEMENTING EPC IN A CLOUD COMPUTER WITH OPENFLOW DATA PLANE

CROSS-REFERENCE TO RELATED APPLICATIONS

The present application is a continuation of U.S. patent application Ser. No. 13/536,838 which was filed on Jun. 28, 2012 (now U.S. Pat. No. 8,867,361 issued Oct. 21, 2014), which is a continuation-in-part of and claims priority from U.S. patent application Ser. No. 13/113,727 filed May 23, 2011 (now U.S. Pat. No. 8,873,398 issued Oct. 28, 2014). Application Ser. No. 13/536,838 is also a non-provisional of and claims priority to provisional U.S. Patent Application No. 61/617,597 filed Mar. 29, 2012 with the title "Implementing EPC in a Cloud Computer with OpenFlow Data Plane."

FIELD OF THE INVENTION

The embodiments of the invention relate to a method and system for implementing a control plane of an evolved packet core in a cloud computer system. Specifically, the embodiments of the invention relate to the use of the OpenFlow protocol to implement control a data plane by the control plane being execute in a cloud computer system.

BACKGROUND

The general packet radios system (GPRS) is a system that is used for transmitting Internet Protocol packets between user devices such as cellular phones and the Internet. The GPRS system includes the GPRS core network, which is an integrated part of the global system for mobile communication (GSM). These systems are widely utilized by cellular phone network providers to enable cellular phone services over large areas.

The GPRS tunneling protocol (GTP) is an important communication protocol utilized within the GPRS core network. GTP enables end user devices (e.g., cellular phones) in a GSM network to move from place to place while continuing to connect to the Internet. The end user devices are connected to other devices through a gateway GPRS support node (GGSN). The GGSN tracks the end user device's data from the end user device's serving GPRS support node (GGSN) that is handling the session originating from the end user device.

Three forms of GTP are used by the GPRS core network. GTP-U is used for transfer of user data in separated tunnels for each packet data protocol (PDP) context. GTP-C is used for control including setup and deletion of PDP contexts, verification of GGSN and SGSN reachability, and updates. When end user devices move from one SGSN to another GTP-C is used to affect this transfer. GTP' is used for the transfer of charging data from GSM to the charging gateway function (CGF), which provides requisite end user device usage information to a billing system.

SUMMARY

A method implements a control plane of an evolved packet core (EPC) of a third generation partnership project (3GPP) long term evolution (LTE) network in a cloud computing system. The cloud computing system includes a cloud manager and a controller. The controller executes a plurality of control plane modules. The control plane communicates with the data plane of the EPC implemented in a plurality of network elements of the 3GPP LTE network through a control protocol. The EPC with the control plane implemented in the cloud computing system utilizes resources more efficiently than an architecture with the control plane implemented in the plurality of network elements of the 3GPP LTE network. The method comprises the steps of initializing the plurality of control plane modules of the EPC within the controller. Each control plane module in the plurality of control plane modules is initialized as a separate virtual machine by the cloud manager. Each control plane module provides a set of control plane functions for managing the data plane. The cloud manager monitors resource utilization of each control plane module and the control plane traffic handled by each control plane module. The cloud manager detects a threshold level of resource utilization or traffic load for one of the plurality of control plane modules of the EPC. A new control plane module is initialized as a separate virtual machine by the cloud manager in response to detecting the threshold level. The new control plane module shares the load of the one of the plurality of control plane modules and signals the plurality of network elements in the data plane to establish flow rules and actions to establish differential routing of flows in the data plane using the control protocol, wherein the control protocol is an OpenFlow protocol, and wherein flow matches are encoded using an extensible match structure in which the flow match is encoded as a type-length-value (TLV).

A cloud computer system implements a control plane of an evolved packet core (EPC) of a third generation partnership project (3GPP) long term evolution (LTE) network. The control plane communicates with the data plane of the EPC that is implemented in a plurality of network elements of the 3GPP LTE network through a control protocol. The EPC with the control plane implemented in the cloud computing system utilizes resources more efficiently than an architecture with the control plane implemented in the plurality of network elements of the 3GPP LTE network. The cloud computing system, comprises a controller configured to execute a plurality of control plane modules of the EPC, each control plane module configured to provide a set of control plane functions for managing the data plane and to signal the plurality of network elements in the data plane to establish flow rules and actions to establish differential routing of flows in the data plane using the control protocol, wherein the control protocol is an OpenFlow protocol, and wherein flow matches are encoded using an extensible match structure in which the flow match is encoded as a type-length-value (TLV) and a cloud manager communicatively coupled to the controller. The cloud manager is configured to initialize each of the plurality of control plane modules within the controller as a separate virtual machine, monitor resource utilization of each control plane module and the control plane traffic handled by each control plane module, detect whether a threshold level of resource utilization or traffic load has been reached by any of the plurality of control plane modules of the EPC, and initialize a new control plane module as a separate virtual machine in response to detecting the threshold level, the new control plane module to share the load of the one of the plurality of control plane modules that exceeded the threshold level.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 7A and 7B are a flowchart of one embodiment of process for OpenFlow header processing.

FIG. 10 is a diagram of one embodiment of the header fields in the primary GTP-U encapsulation header.

FIG. 17 is a diagram of one embodiment of the OpenFlow flow table modification for GTP TEID routing.

FIG. 18 is a diagram of the structure of a flow table row.

FIG. 19 is a diagram of one embodiment of an extensible matching structure.

DETAILED DESCRIPTION

Figure 1:
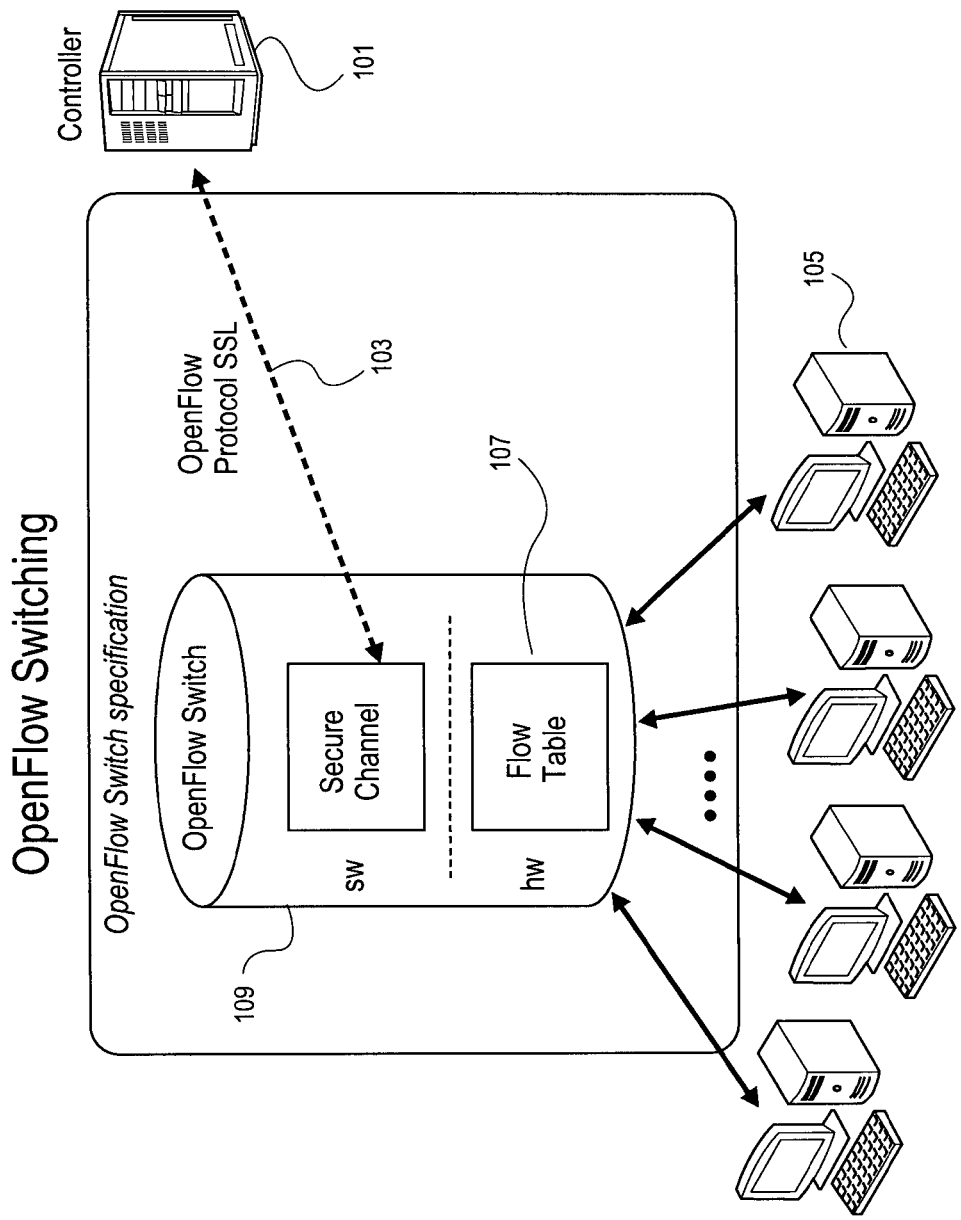
FIG. 1 is a diagram of one embodiment of an example network with an OpenFlow switch.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 7A and 7B, 14, 20 and 22. However, it should be understood that the operations of the flow diagrams can be performed by embodiments of the invention other than those discussed with reference to FIGS. 1-6, 8-13, 15-19 and 21, and the embodiments discussed with reference to FIGS. 1-6, 8-13, 15-19 and 21 can perform operations different than those discussed with reference to the flow diagrams of FIGS. 7A and 7B, 14, 20 and 22.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

The embodiments of the present invention provide a method and system for avoiding the disadvantages of the prior art. The disadvantages of the prior art are that prior implementations of the evolved packet core use a pool of servers that are dedicated to a specific network entity, such as a server pool that is dedicated to hosting a mobility management entity (MME). When additional signaling demands require that extra capacity, then a new MME instance is instantiated in the server pool. However, when demand is high for the services of a policy and charging rules function (PCRF) and low for MMEs, the server pool dedicated to the PCRF servers will be heavily utilized, but the server pool for the MMEs is underutilized. These underutilized server pools continue to require maintenance and incur operating expenses, but are not providing optimum performance for the network operator.

In some situations, managed services companies build and run mobile operator networks, while the mobile operator itself handles marketing, billing, and customer relations. The signaling and data traffic for each mobile operator network is kept private and isolated from the traffic of their competitors, even though their network and their competitors' networks may be managed by the same managed services company. The managed services company must maintain a completely separate server pool and physical signaling network for each mobile operator it supports. As a result, there is a large duplication of resources and an underutilization of server capacity. This increases operating expenses for the managed services companies and the mobile operator network due to the additional equipment, power and cooling requirements.

The EPC architecture as it is currently defined allows only one point of presence (PoP) between the mobile operator's fixed core/Internet and the mobile aggregation network, that is, there is a single packet data network (PDN) gateway. Mobile network operators cannot set up multiple peering points and PoPs between neighboring operators within the aggregation network. This would reduce the amount of traffic that flows into the mobile operator's core network, thereby reducing the need for expensive and time consuming core network upgrades. In addition, peering points are usually without cost to operators as long as the service level agreements (SLA)s are observed. However, this flexibility of deployment is unavailable to mobile operators due to the need to anchor their PoP with the core/Internet at a single mobile gateway.

The EPC architecture also contains little flexibility for specialized treatment of user flows. Though the architecture does provide support for establishing quality of service (QoS), other sorts of data management are not available. For example services involving middleboxes, such as specialized deep packet inspection or interaction with local data caching and processing resources that might be utilized for transcoding or augmented reality applications, is difficult to support with the current EPC architecture. Almost all such applications require the packet flows to exit through the PDN Gateway, thereby being de-tunnelled from GTP, and to be processed within the wired network.

Implementing the control plane of an EPC in a cloud computing facility and the data plane of the EPC using a set of OpenFlow switches, as well as managing communication between the control plane and the dataplane using the OpenFlow protocol (e.g., OpenFlow 1.1), creates a problem that the OpenFlow protocol does not support GTP or GTP tunnel endpoint identifier (TEID) routing, which is necessary for implementing the dataplane of the EPC The embodiments of the invention overcome these disadvantages of the prior art. The disadvantages of the prior art are avoided by splitting the control plane and the data plane for the EPC architecture and to implement the control plane by deploying the EPC control plane entities in a cloud computing facility, while the data plane is implemented by a distributed collection of OpenFlow switches. The OpenFlow protocol is used to connect the two, with enhancements to support GTP routing. While the EPC architecture already has a split between the control plane and the data plane, in the sense that the serving gateway (S-GW) and the PDN gateway (P-GW) are data plane entities while the MME, PCRF, and home subscriber server (HSS) are control plane entities, this split was made at the level of the mobility management protocol, GTP.

The standard EPC architecture assumes a standard routed IP network for transport on top of which the mobile network entities and protocols are implemented. The enhanced EPC architecture described herein is instead at the level of IP routing and media access control (MAC) switching. Instead of using L2 routing and L3 internal gateway protocols to distribute IP routing and managing Ethernet and IP routing as a collection of distributed control entities, L2 and L3 routing management is centralized in a cloud facility and the routing is controlled from the cloud facility using the OpenFlow protocol. As used herein, the "OpenFlow protocol" refers to the OpenFlow network protocol and switching specification defined in the OpenFlow Switch Specification at www.openflowswitch.org a web site hosted by Stanford University. As used herein, an "OpenFlow switch" refers to a network element implementing the OpenFlow protocol.

The standard EPC control plane entities—the MME, PCRF, and HSS—are likewise deployed in the cloud, along with the control plane parts of the S-GW and P-GW, namely, the S-GW-C and the P-GW-C. The data plane consists of standard OpenFlow switches with enhancements as needed for routing GTP packets, rather than IP routers and Ethernet switches. At a minimum, the data plane parts of the S-GW and P-GW, namely, the S-GW-D and the P-GW-D, and the packet routing part of the E-NodeB in the E-UTRAN require OpenFlow enhancements for GTP routing. Additional enhancements for GTP routing may be needed on other switches within the EPC architecture depending on how much fine grained control over the routing an operator requires.

The split between the control and data plane parts of the EPC can be used together with virtual private cloud (VPC) technology to implement multiple PoPs within a single EPC, provide GTP flow-specific routing for specialized applications, and run multiple operator networks from a single cloud computing facility.

In one embodiment, the cloud based EPC system can be implemented as a set of hardware devices. In another embodiment, the system components are implemented in software (for example microcode, assembly language or higher level languages). These software implementations can be stored on a non-transitory computer-readable medium. A non-transitory "computer-readable" medium can include any medium that can store information. Examples of the non-transitory computer-readable medium include a read only memory (ROM), a floppy diskette, a CD Rom, a DVD, a flash memory, a hard drive, an optical disc or similar medium.

OpenFlow 1.0 Networks

FIG. 1 is a diagram of one embodiment of an example network with an OpenFlow switch, conforming to the OpenFlow 1.0 specification. The OpenFlow 1.0 protocol enables a controller 101 to connect to an OpenFlow 1.0 enabled switch 109 using a secure channel 103 and control a single forwarding table 107 in the switch 109. The controller 101 is an external software component executed by a remote computing device that enables a user to configure the OpenFlow 1.0 switch 109. The secure channel 103 can be provided by any type of network including a local area network (LAN) or a wide area network (WAN), such as the Internet.

Figure 2:
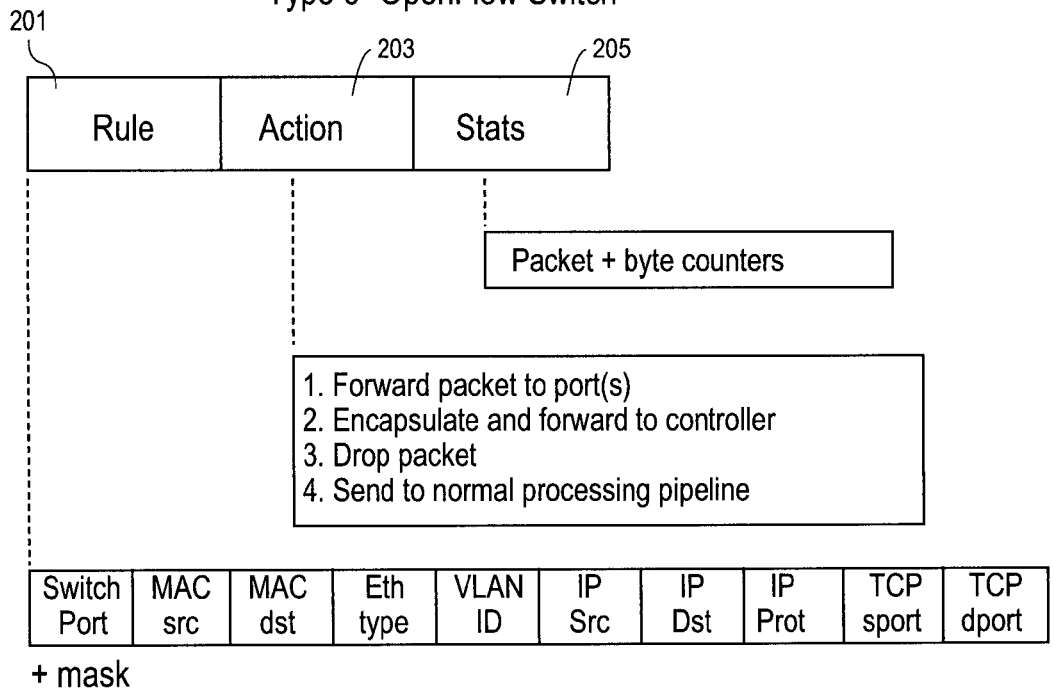
FIG. 2 is a diagram illustrating one embodiment of the contents of a flow table entry.

FIG. 2 is a diagram illustrating one embodiment of the contents of a flow table entry. The forwarding table 107 is populated with entries consisting of a rule 201 defining matches for fields in packet headers; an action 203 associated to the flow match; and a collection of statistics 205 on the flow. When an incoming packet is received a lookup for a matching rule is made in the flow table 107. If the incoming packet matches a particular rule, the associated action defined in that flow table entry is performed on the packet.

A rule 201 contains key fields from several headers in the protocol stack, for example source and destination Ethernet MAC addresses, source and destination IP addresses, IP protocol type number, incoming and outgoing TCP or UDP port numbers. To define a flow, all the available matching fields may be used. But it is also possible to restrict the matching rule to a subset of the available fields by using wildcards for the unwanted fields.

The actions that are defined by the specification of OpenFlow 1.0 are Drop, which drops the matching packets; Forward, which forwards the packet to one or all outgoing ports, the incoming physical port itself, the controller via the secure channel, or the local networking stack (if it exists). OpenFlow 1.0 protocol data units (PDUs) are defined with a set of structures specified using the C programming language. Some of the more commonly used messages are: report switch configuration message; modify state messages (including a modify flow entry message and port modification message); read state messages, where while the system is running, the datapath may be queried about its current state using this message; and send packet message, which is used when the controller wishes to send a packet out through the datapath.

OpenFlow 1.0 supports "vendor extensions" that allow certain protocol elements to be extended. Protocol messages and table actions can be extended, but flow-matching rules cannot. The use of these extensions in connection with the cloud based EPC architecture is discussed further herein below.

OpenFlow 1.1 Networks

Figure 3:
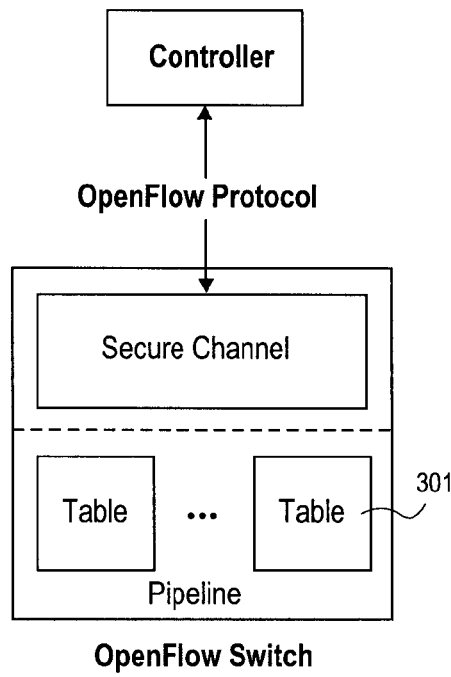
FIG. 3 illustrates another example architecture implementing OpenFlow.

FIG. 3 illustrates another example architecture implementing OpenFlow, conforming to the OpenFlow 1.1 specification. In this embodiment, there is an explicit provision for multiple flow tables 301. This allows the packet processing pipeline to mix and match particular rules and actions without causing a combinatorial explosion in the table size. For example, one flow table can perform QoS processing while a second flow table does routing.

Figure 4:
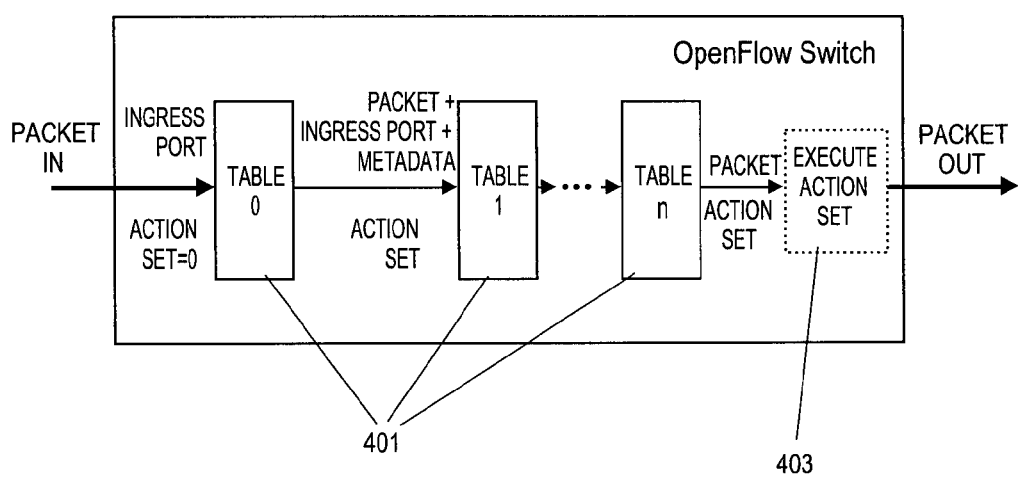
FIG. 4 illustrates one embodiment of the processing of packets through an OpenFlow switch packet processing pipeline.

FIG. 4 illustrates one embodiment of the processing of packets through an OpenFlow 1.1 switched packet processing pipeline. A received packet is compared against each of the flow tables 401. After each flow table match, the actions are accumulated into an action set. If processing requires matching against another flow table, the actions in the matched rule include an action directing processing to the next table in the pipeline. Absent the inclusion of an action in the set to execute all accumulated actions immediately, the actions are executed at the end 403 of the packet processing pipeline. An action allows the writing of data to a metadata register, which is carried along in the packet processing pipeline like the packet header.

Figures 5, 6:
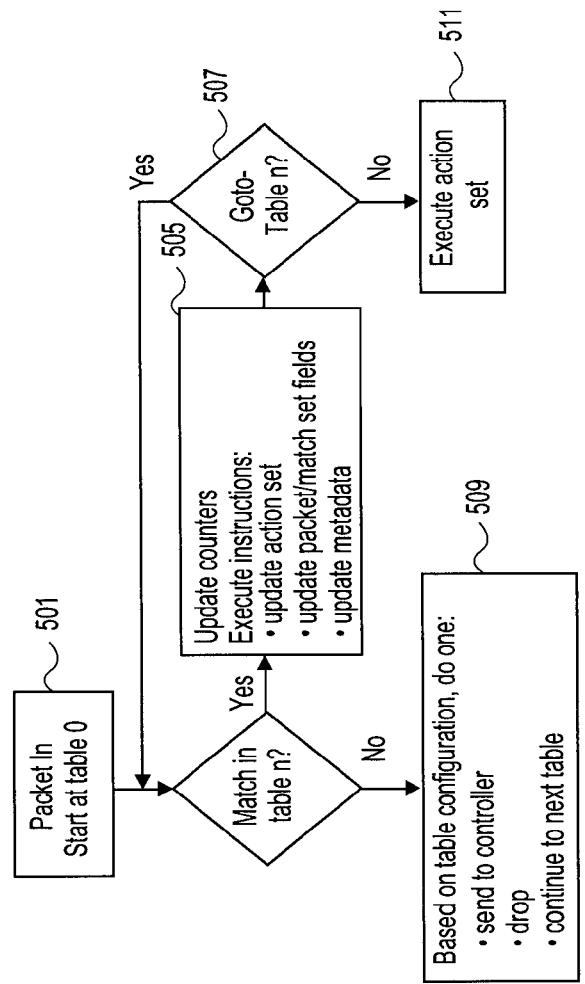
FIG. 5 is a flowchart of one embodiment of the OpenFlow rule matching process.
FIG. 6 is a diagram of the fields, which a matching process can utilize for identifying rules to apply to a packet.

FIG. 5 is a flowchart of one embodiment of the OpenFlow 1.1 rule matching process. OpenFlow 1.1 contains support for packet tagging. OpenFlow 1.1 allows matching based on header fields and multi-protocol label switching (MPLS) labels. One virtual LAN (VLAN) label and one MPLS label can be matched per table. The rule matching process is initiated with the arrival of a packet to be processed (Block 501). Starting at the first table 0 a lookup is performed to determine a match with the received packet (Block 503). If there is no match in this table, then one of a set of default actions is taken (i.e., send packet to controller, drop the packet or continue to next table) (Block 509). If there is a match, then an update to the action set is made along with counters, packet or match set fields and meta data (Block 505). A check is made to determine the next table to process, which can be the next table sequentially or one specified by an action of a matching rule (Block 507). Once all of the tables have been processed, then the resulting action set is executed (Block 511). FIG. 6 is a diagram of the fields, which a matching process can utilize for identifying rules to apply to a packet.

Figure 7A:
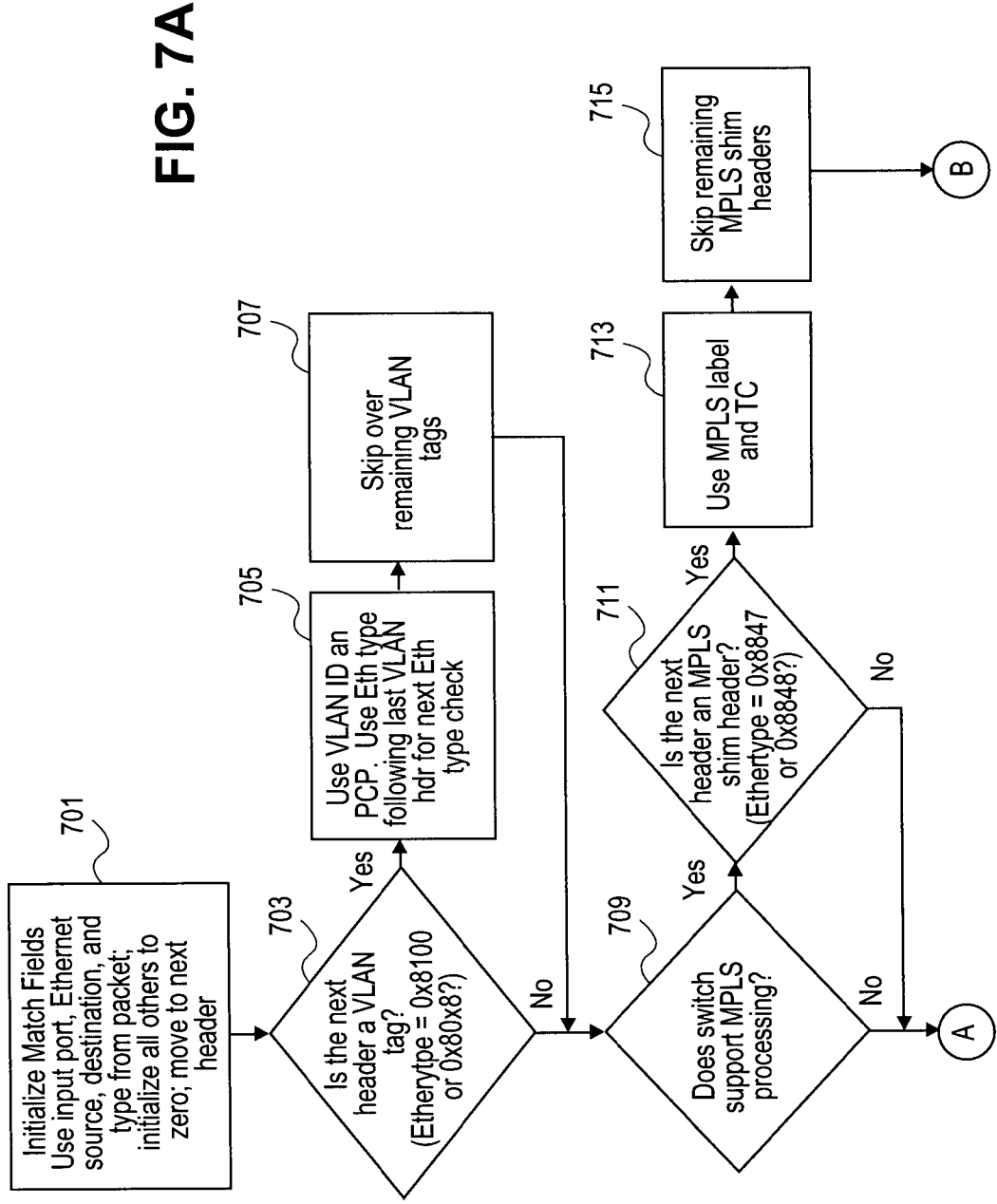

Actions allow manipulating of tag stacks by pushing and popping labels. Combined with multiple tables, VLAN or MPLS label stacks can be processed by matching one label per table. FIGS. 7A and 7B are a flow chart of one embodiment of a header parsing process. The parsing process matches a packet header by initializing a set of match fields (Block 701) and checking for the presence of a set of different header types. The process checks for a VLAN tag (Block 703). If the VLAN tag is present, then there are a series of processing steps for the VLAN tag (Blocks 705-707). If the switch supports MPLS (Block 709), then there are a series of steps for detecting and processing the MPLS header information (Blocks 711-715). If the switch supports address resolution protocol (ARP), then there are a series of steps for processing the ARP header (Blocks 719 and 721). If the packet has an IP header (Block 723), then there are a series of steps for processing the IP header (Blocks 725-733). This process is performed for each received packet.

In one embodiment, a group table can be supported in conjunction with the OpenFlow 1.1 protocol. Group tables enable a method for allowing a single flow match to trigger forwarding on multiple ports. Group table entries consist of four fields: a group identifier, which is a 32 bit unsigned integer identifying the group; a group type that determines the group's semantics; counters that maintain statistics on the group; and an action bucket list, which is an ordered list of action buckets, where each bucket contains a set of actions to execute together with their parameters.

There are four different types of groups: All, which execute all actions in the bucket list, this is used for broadcast or multicast forwarding; Select, which execute one bucket per packet, based on an algorithm determined by the switch which is outside the OpenFlow protocol, this is used to implement multipath forwarding; Indirect, which execute the single bucket on all packets, this allows multiple flows or groups to point to a single collection of actions rather than having the actions defined in multiple forwarding table entries; Fast Failover, which execute the first live bucket, where each bucket is associated with a port that controls its liveness, this enables the switch to failover to another port without involving the controller.

OpenFlow 1.1 can be utilized to support virtual ports. A virtual port, as used herein, is an "action block" that performs some kind of processing action other than simply forwarding the packet out to a network connection like physical ports do. Examples of a few built-in virtual ports include: ALL, which forwards the port out all ports except for the ingress port and any ports that are marked "Do Not Forward;" CONTROLLER, which encapsulates the packet and sends it to the controller; TABLE, which inserts the packet into the packet processing pipeline by submitting it to the first flow table, this action is only valid in the action set of a packet-out message; and IN_PORT, which sends the packet out the ingress port. In other embodiments, there can also be switched-defined virtual ports.

EPC Architecture

Figure 8:
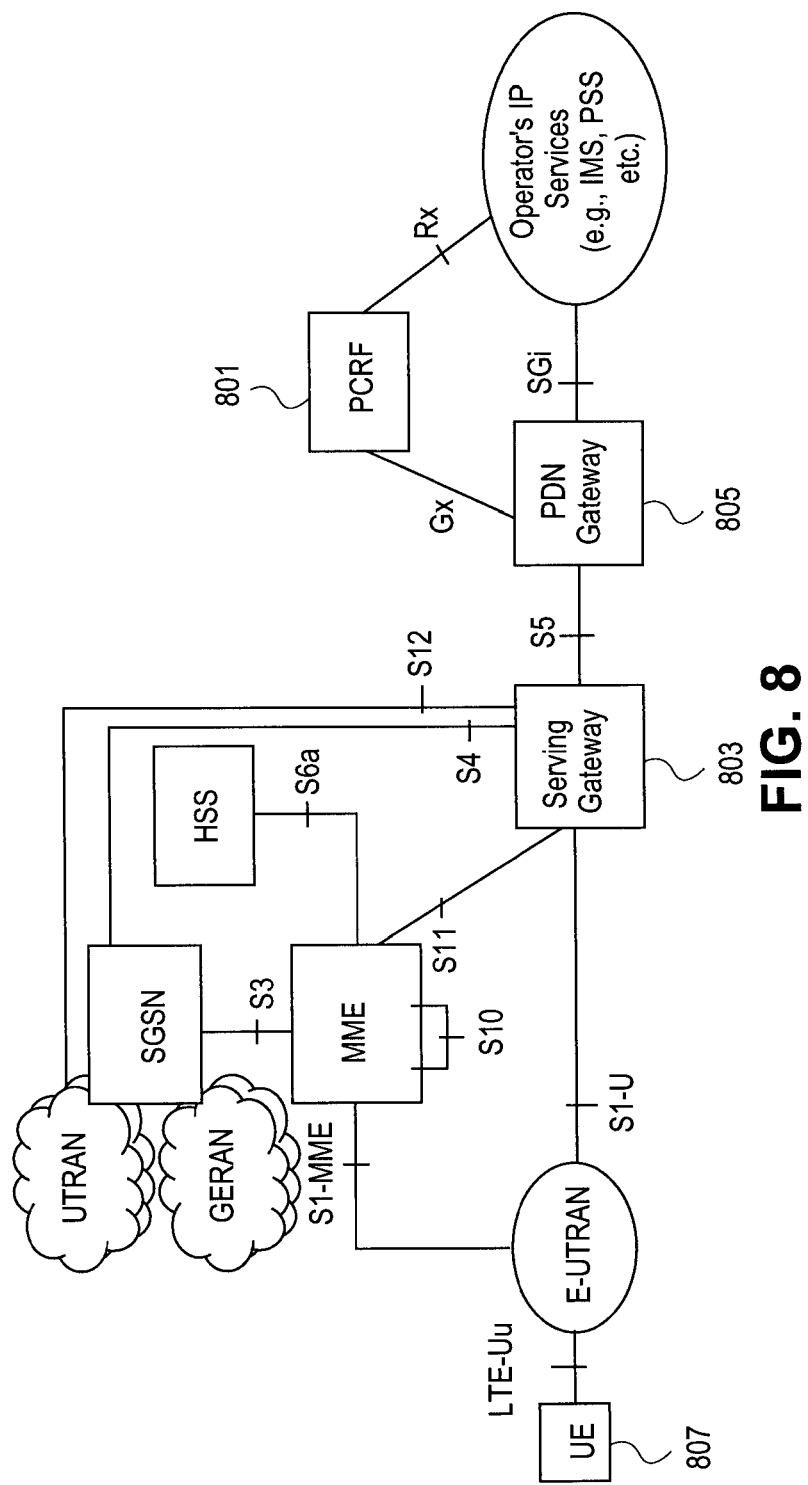
FIG. 8 is a diagram of one embodiment of an evolved packet core (EPC).

FIG. 8 is a diagram of one embodiment of an evolved packet core (EPC). The EPC is the next generation packet aggregation network for $3^{rd}$ generation partnership project (3GPP) including 3GPP long term evolution (LTE) and non-3GPP mobile wireless systems, which will also support fixed, broadband systems as well. FIG. 8 shows a basic architecture of the EPC for 3GPP access systems. Additional functionality supports roaming terminals, non-3GPP mobile systems and fixed, broadband access.

The illustrated embodiment has a separate Serving Gateway (S-GW) 803 and PDN Gateway (P-GW) 805. In other embodiments, the S5 interface is an internal interface and the S-GW 803 and P-GW 805 are merged. The primary functions of the EPC with respect to mobile wireless networking are mobility management and QoS. These functions are not typically provided in a fixed broadband network but they are crucial for wireless networks. Mobility management is necessary to ensure packet network connectivity when a wireless terminal moves from one base station to another. QoS is necessary because, unlike fixed networks, the wireless link is severely constrained in how much bandwidth it can provide to the terminal, so the bandwidth needs to be managed more tightly than in fixed networks in order to provide the user with acceptable quality of service.

The signaling for implementing the mobility management and QoS functions is provided by the GPRS Tunneling Protocol (GTP). GTP has two components: GTP-C, which is a control plane protocol that supports establishment of tunnels for mobility management and bearers for QoS management that matches wired backhaul and packet core QoS to radio link QoS; and GTP-U, which is a data plane protocol used for implementing tunnels between network elements that act as routers. The EPC also supports the Proxy Mobile IP (P-MIP) tunneling protocol on the S5 interface for mobility management.

In the EPC, a bearer is a transmission channel through an EPC packet network which has a defined set of data transmission characteristics (quality of service data rate and flow control). EPC bearers are typically implemented at the network layer as DiffServ Code Points (DSCPs) or at the MAC layer as IEEE 802.1q VLANs with 802.1p (incorporated into the 802.1d standard0 traffic class priorities. The PCRF (Policy and Charging Resource Function) 801 identifies packet flows from the user equipment (UE) 807 that require bearers based on service requests from subsystems such as the IP multimedia subsystem (IMS). The packet flows to be included in a bearer are identified to the gateways and radio base station (E-NodeB) by 5 tuples, consisting of the IP source and destination address, the IP source and destination port, and the protocol identifier. The five tuples together with a DSCP for the QoS class identify an uplink and downlink packet filter. One bearer is set up per terminal IP address and QoS traffic class. The PCRF supplies a collection of four QoS parameters describing the bearer including: a quality class identifier (QCI) that specifies the QoS for the radio; allocation retention priority (ARP), which is an indicator of how the control plane should prioritize the bearer when requests for modification are made and resource conflicts arise; and a guaranteed bit rate (GBR) and maximum bit rate (MBR, optional) where these specify the guaranteed and maximum bit rates the bearer can receive. These are only defined for guaranteed—i.e. non-best effort—bearers.

Figure 9:
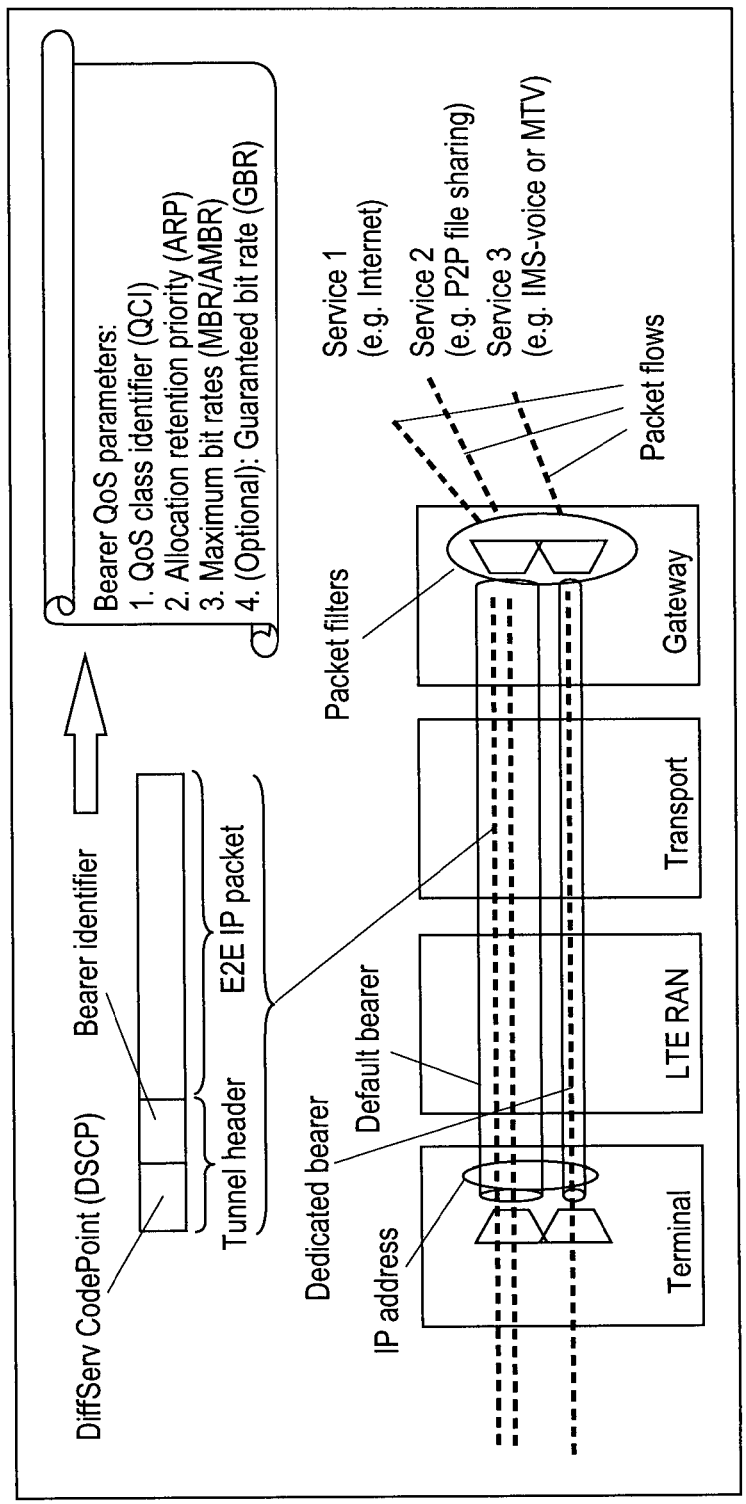
FIG. 9 is a diagram of one embodiment of a high level arrangement of bearers in the EPC.

The gateways and radio base station map the QCI to a specific DSCP. This may then be subsequently mapped to a specific VLAN and 802.1p class if the transport network between the E-NodeB and the S-GW 803, or between the S-GW 803 and P-GW 805 have no IP routers and are routed strictly by Layer 2 (Ethernet). The mapping between the DSCP and QCI indicators is typically configured by hand into the packet gateways and radio base station using a network management system. In addition to bearers with specified QoS set up on demand, each terminal receives a "default" bearer into which all packet flows having unspecified QoS are classed, typically flows associated with best effort data applications like Web browsing. FIG. 9 is a diagram of one embodiment of a high level arrangement of bearers in the EPC.

In addition to the QoS parameters, each bearer has an associated GTP tunnel. A GTP tunnel consists of the IP address of the tunnel endpoint nodes (radio base station, S-GW 803, and P-GW 805), a source and destination UDP port, and a Tunnel Endpoint Identifier (TEID). GTP tunnels are unidirectional, so each bearer is associated with two TEIDs, one for the uplink and one for the downlink tunnel. One set of GTP tunnels (uplink and downlink) extends between the radio base station and the S-GW 803 and one set extends between the S-GW 803 and the P-GW 805. The UDP destination port number for GTP-U is 2152 while the destination port number for GTP-C is 2123. The source port number is dynamically allocated by the sending node. FIG. 10 is a diagram of one embodiment of the header fields in the primary GTP-U encapsulation header.

Cloud Computing

Data centers offer computing, storage, and network communication resources to outside customers. The offered services can consist of elastic, on demand processing, storage that for most practical purposes is limited only by the customer's ability to pay, and network bandwidth into the Internet. This set of services provided by a data center is referred to herein as cloud computing.

Server virtualization technology allows a pool of servers to be managed as essentially one large compute resource. A layer of software called a hypervisor sits between the operating system and the hardware. The hypervisor schedules the execution of virtual machines (VMs). A VM is an operating system image packaged with some applications. The hypervisor allows a VM to be suspended and moved between servers to load balance. Load balancing and monitoring of VM execution to catch crashes provides the same kind of fault tolerance and scalability services for enterprise applications that are achieved at much higher cost with specialized solutions. A cloud manager system oversees the execution of VMs, the scheduling of execution to meet the demand of the VMs and the optimization of server utilization and minimization of power consumption. The cloud manager or cloud operating system is a software program that can schedule execution to allow an in-service upgrade of hardware and software without impacting ongoing service provisioning to the VMs and their applications in the cloud computing system.

To support the arbitrary movement of VMs between machines, the networking within the data center must also be virtualized. Cloud computing systems can virtualize the network by incorporating a virtual switch into the hypervisor. The virtual switch provides virtual network ports to the VMs executing under the control of the hypervisor. The virtual switch software also allows the network resources to be virtualized in a manner similar to how the server resources are virtualized by the hypervisor. The hypervisor and the virtual switch can thereby co-operate to allow VMs to be moved between servers. When the hypervisor moves a VM, it communicates with the virtual switch about the new location, and the virtual switch ensures that the network routing tables for the VM's addresses (L2 MAC address, potentially also the IP address) are updated so packets are routed to the new location.

A cloud computing system can be composed of any number of computing devices having any range of capabilities (e.g., processing power or storage capacity). The cloud computing system can be a private or public system. The computing devices can be in communication with one another across any communication system or network. A cloud computing system can support a single cloud or service or any number of discrete clouds or services. Services, applications and similar programs can be virtualized or executed as standard code. In one embodiment, cloud computing systems can support web services applications. Web services applications consist of a load balancing front end that dispatches requests to a pool of Web servers. The requests originate from applications on remote machines on the Internet and therefore the security and privacy requirements are much looser than for applications in a private corporate network.

Cloud computer systems can also support secure multi-tenancy, in which the cloud computer system provider offers virtual private network (VPN)-like connections between the client's distributed office networks outside the cloud and a VPN within the cloud computing system. This allows the client's applications within the cloud computing system to operate in a network environment that resembles a corporate WAN. For private data centers, in which services are only offered to customers within the corporation owning the data center, the security and privacy requirements for multi-tenancy are relaxed. But for public data centers, the cloud operator must ensure that the traffic from multiple tenants is isolated and there is no possibility for traffic from one client to reach another client network.

Figure 11:
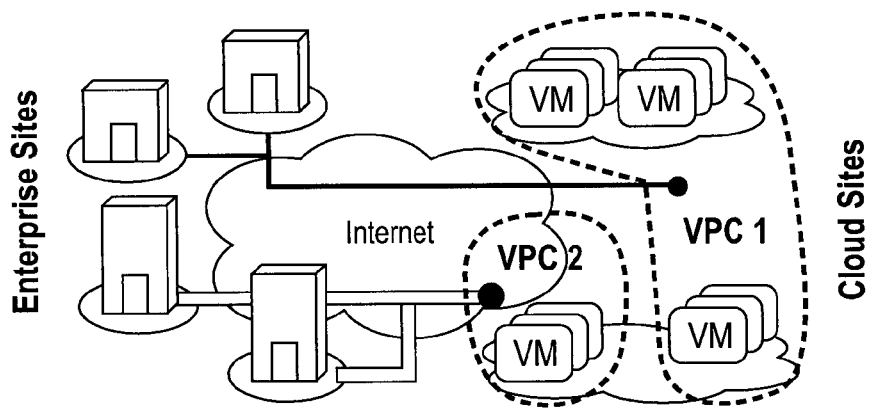
FIG. 11 is a diagram of one embodiment of a cloud computing system servicing a set of clients.

FIG. 11 is a diagram of one embodiment of a cloud computing system servicing a set of clients. A 'set,' as used herein, refers to any positive whole number of items. In the embodiment, shown in FIG. 11, two virtual private clouds (VPCs) are set up for two different external enterprise customers. A VPC consists of a collection of VMs, storage, and networking resources that provide secure multi-tenancy to the enterprises renting space in the cloud. The enterprise customers connect into the VPCs via VPNs over the Internet running on a public operator network.

Figure 12:
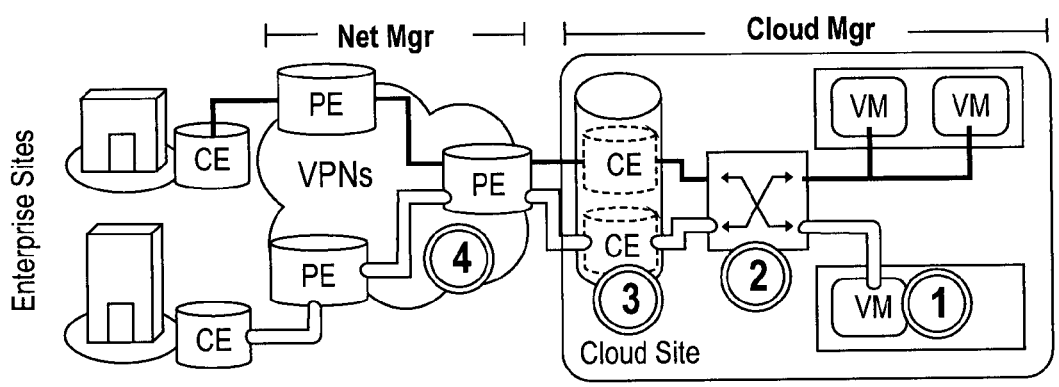
FIG. 12 is a diagram of another embodiment of a cloud computing system showing the process of adding a new service instance to a client's VPC.

FIG. 12 is a diagram of another embodiment of a cloud computing system showing the process of adding a new service instance to a client's VPC. In this case, the in-cloud VPN is implemented using MAC layer Virtual LANs (VLANs). The VM is created on a hypervisor managed server with in the VPC for the enterprise requesting the new service instance (step 1). The virtual switch VLAN is configured to include the new VM into the enterprise in-cloud VPN, thereby establishing service connectivity within the cloud (step 2). The virtual customer edge router (CE) is updated for the new service (step 3). The provider edge router in the operator network where the enterprise VPN is run is updated with the new service (step 4).

EPC Implementation in Cloud Computing System

Figure 13:
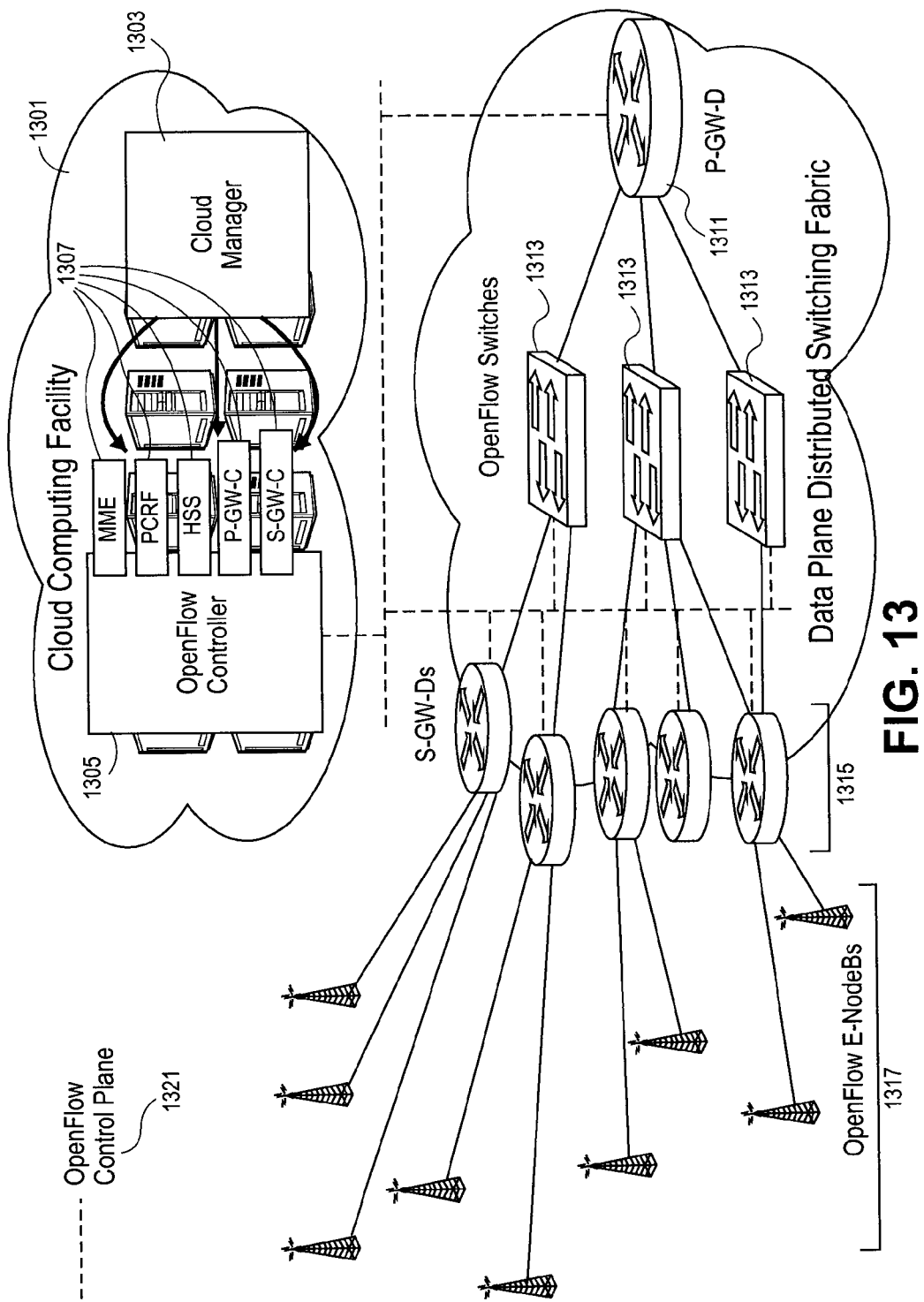
FIG. 13 is a diagram of one embodiment of the EPC implemented in the cloud computing system.

FIG. 13 is a diagram of one embodiment of the EPC implemented in the cloud computing system. The EPC control plane entities (MME, PCRF, HSS) 1307 and the control plane parts of the gateways (S-GW-C, P-GW-C) 1307, i.e. the parts that handle GTP signaling, are implemented in the cloud computing system 1301 as part of the OpenFlow controller 1305. The control plane entites 1307 and the OpenFlow controller 1305 are packaged as VMs. The application programming interface (API) between the OpenFlow controller 1305 and the control plane entities 1307 can be a remote procedure call (RPC) interface or similar interface. This implementation technology is favorable for scalable management of the control plane entities within the cloud, since it allows execution of the control plane entities 1307 and the controller 1305 to be managed separately according to demand. The cloud manager 1303 can be a VM or an application executed within the cloud computing system 1301.

The cloud manager 1303 monitors the central processor unit (CPU) utilization of the EPC control plane entities 1307 and the control plane traffic between the EPC control plane entities 1307 within the cloud. It also monitors the control plane traffic between the end user devices (UEs) and E-NodeBs, which do not have control plane entities in the cloud computing system 1301, and the EPC control plane entities 1307. If the EPC control plane entities 1307 begin to exhibit signs of overloading, such as the utilization of too much CPU time, or the queueing up of too much traffic to be processed, the overloaded control plane entity 1307 requests that the cloud manager 1303 start up a new VM to handle the load. Additionially, the EPC control plane entities 1307 themselves can issue event notifications to the cloud manager 1303 if they detect internally that they are beginning to experience overloading.

The cloud manager 1303 also provides reliability and failover by restarting a VM for a particular control plane entity 1307 or function if any of the EPC control plane entities 1307 should crash. During this restart process the cloud manager can collect diagnostic data, save any core files of the failed EPC control plane entity, and inform the system administrators that a failure occurred. The control plane entities 1307 maintains the same protocol interface between themselves as in the 3GPP EPC architecture shown in FIG. 8.

The OpenFlow control plane 1321, shown here as a dotted line, manages the routing and switching configuration in the network. The OpenFlow control plane 1321 connects the cloud computing system 1303 to the S-GW-Ds 1315, the standard OpenFlow switches 1313, and the P-GW-D 131. The physical implementation of the OpenFlow control plane 1321 can be as a completely separate physical network, or it may be a virtual network running over the same physical network as the data plane, implemented with a prioritized VLAN or with an MPLS label switched path or even with a generic routing encapsulation (GRE) or other IP tunnel. The OpenFlow control plane 1321 can in principle use the same physical control plane paths as the GTP-C and other mobile network signaling. The S-GW-Ds 1315 and the P-GW-Ds 1311 act as OpenFlow GTP-extended gateways, encapsulating and decapsulating packets using the OpenFlow GTP switch extensions described further herein below.

The E-NodeBs 1315 have no control plane entities in the cloud because the radio access network (RAN) signaling required between the MME and the E-NodeB includes radio parameters, and not just IP routing parameters. Therefore, there is no OpenFlow control plane 1321 connection between the OpenFlow controller 1305 in the cloud computing system 1301 and the E-NodeBs 1315. The E-NodeBs 1315 can however act as OpenFlow GTP-extended gateways by implementing a local control to data plane connection using OpenFlow. This allows the packet switching side of the E-NodeBs 1315 to utilize the same OpenFlow GTP switching extensions as the packet gateways.

The operation of the EPC cloud computer system as follows. The UE 1317, E-NodeB 1317, S-GW-C 1307, and P-GW-C signal 1307 to the MME, PCRF, and HSS 1307 using the standard EPC protocols, to establish, modify, and delete bearers and GTP tunnels. This signaling triggers procedure calls with the OpenFlow controller to modify the routing in the EPC as requested. The OpenFlow controller configures the standard OpenFlow switches, the Openflow S-GW-D 1315, and P-GW-D 1311 with flow rules and actions to enable the routing requested by the control plane entities. Details of this configuration are described in further detail herein below.

Figure 14:
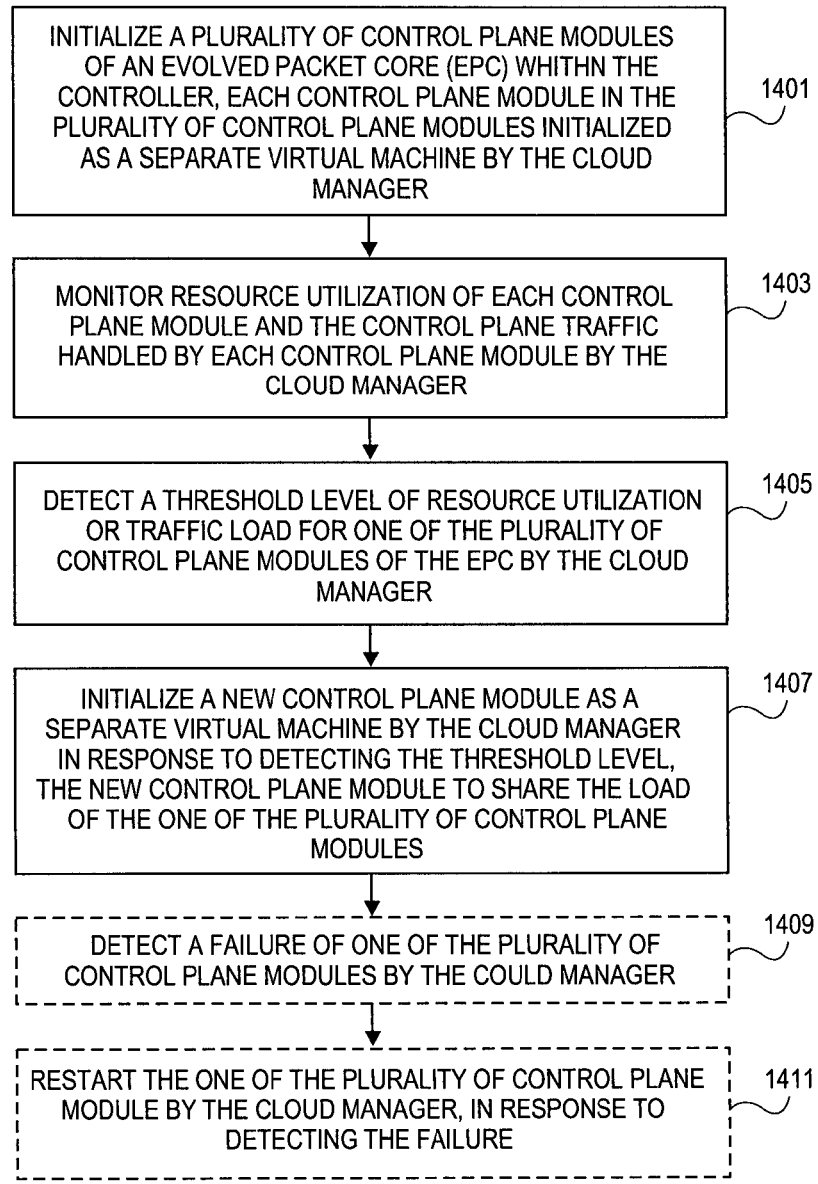
FIG. 14 is a diagram of one embodiment of how the EPC in the cloud computing system enables a managed services company to manage multiple operator networks out of a single data center.

FIG. 14 is a flowchart of one embodiment of the basic operation of the EPC. In one embodiment, the process begins with the initialization of the control plane modules of the EPC within the OpenFlow controller in the cloud computing system (Block 1401). Each control plane module in the plurality of control plane modules is initialized as a separate VM by the cloud manager. The cloud manager then monitors the resource utilization of each control plane module as well as the amount and type of control plane traffic handled by each control plane module (Block 1403). The cloud manager can directly monitor this data, receive reports from the control plane modules or any combination thereof.

If the cloud manager detects a threshold level of resource utilization or traffic load for any one of the plurality of control plane modules being monitored (Block 1405), the cloud manager can takes steps to automatically respond to this scenario. The cloud manager can initialize a new control plane module or an instance of such a control plane module as a separate virtual machine (Block 1407). This new control plane module or instance can then share the load of existing control plane modules or instances of the same type thereby alleviating the load on these modules dynamically.

Similarly, the cloud manager may detect the failure or the underutilization of one of the plurality of control plane modules (Block 1409). The cloud manager can then restart a failed control plane module or terminate an underutilized control plane module (Block 1411). Restarting the control plane module ensures a level of load sharing for a pool of control plane modules. Deactivating a control plane module frees up the resources and reduces the overhead created by the control plane module. The cloud manager can perform these functions across VPCs and mobile operators using the cloud computing system resources, thereby maximizing the use of available resources and reducing the cost of operation while maintaining strict separation of data and traffic between mobile operators.

Figure 15:
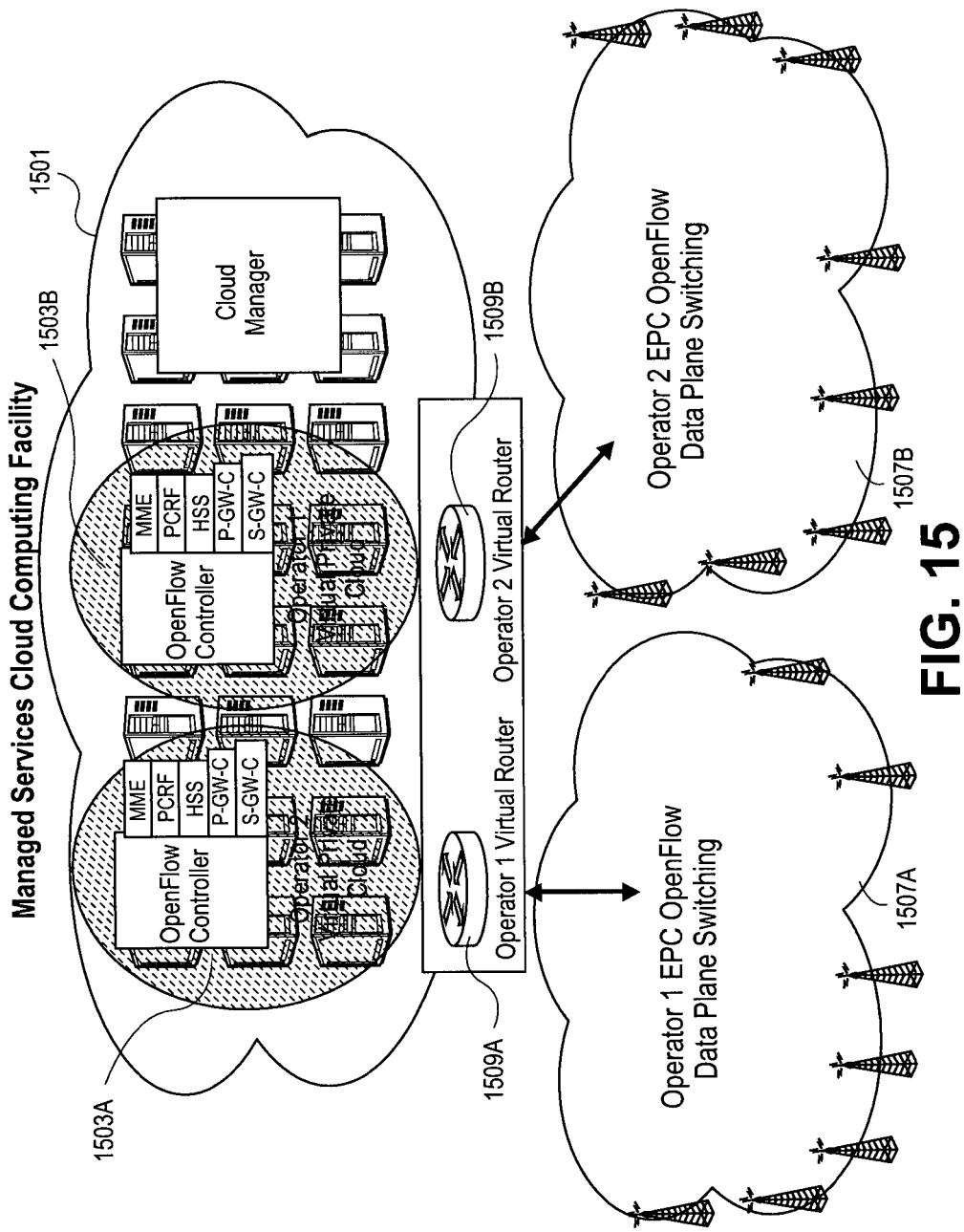

FIG. 15 is a diagram of one embodiment of how the EPC in the cloud computing system enables a managed services company to manage multiple operator networks out of a single data center. The managed services cloud computing facility 1501 runs separate instances of the EPC control plane for every mobile operator with which the managed services company has a contract. Each EPC instance is in a VPC 1503A,B that isolates the mobile operator's traffic from other tenants in the cloud computing facility 1501 of the data center. The EPC control plane instance for a mobile operator is connected to the mobile operator's geographically distributed EPC OpenFlow data plane switching fabric 1507A,B and the mobile operator's base stations through a virtual edge router 1509A,B. The virtual edge router 1509A,B routes traffic from the data center to and from the appropriate mobile operator EPC data plane switching fabric 1507A,B. In some cases, the mobile operators may even share base stations and EPC switching fabrics, though the example embodiment in FIG. 15 shows a case where the two mobile operators have separate switching fabrics.

EPC Peering and Differential Routing in a Cloud Computing System

Figure 16:
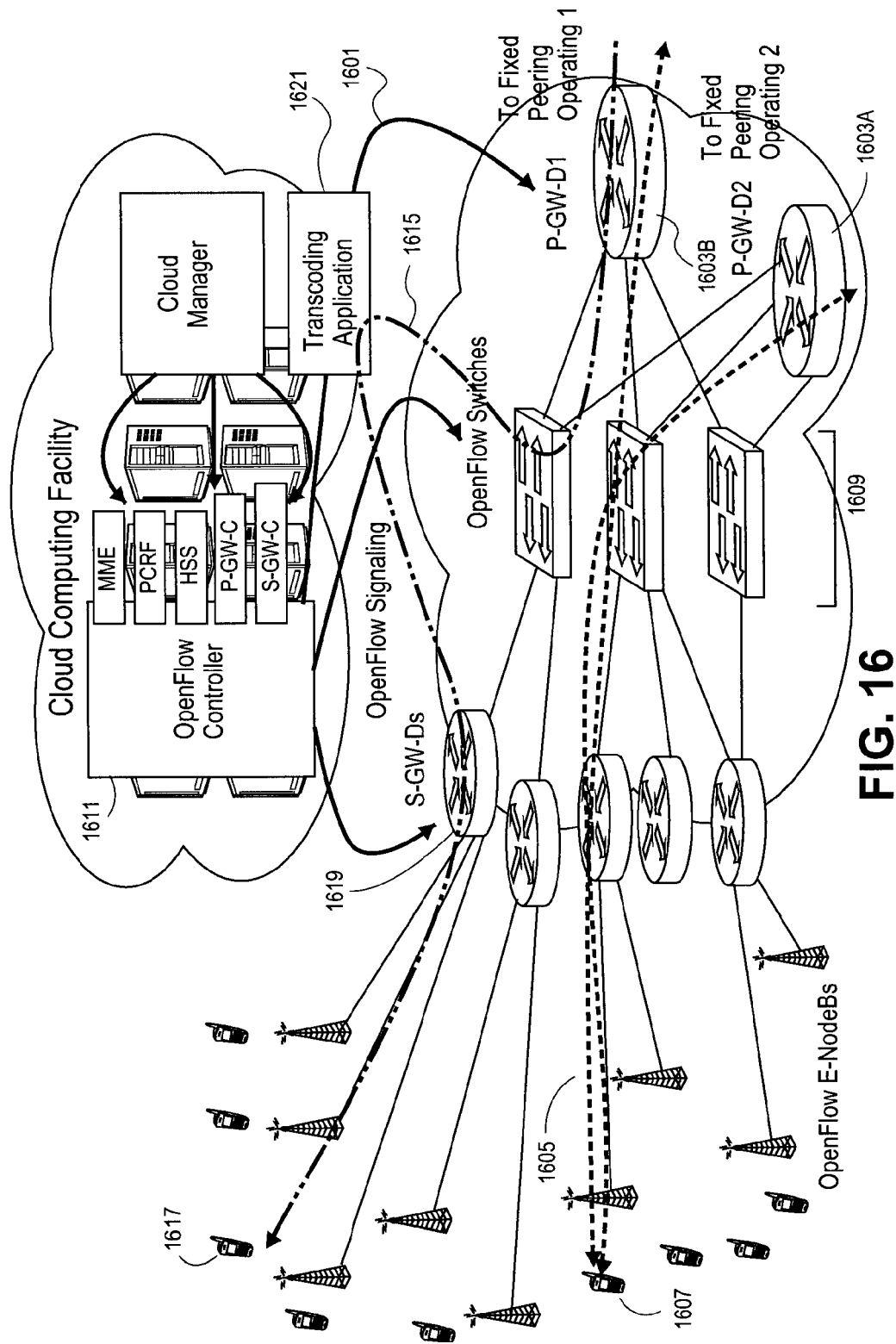
FIG. 16 is a diagram of one embodiment of a process for EPC peering and differential routing for specialized service treatment.

FIG. 16 is a diagram of one embodiment of a process for EPC peering and differential routing for specialized service treatment. The OpenFlow signaling, indicated by the solid lines and arrows 1601, sets up flow rules and actions on the switches and gateways within the EPC for differential routing. These flow rules direct GTP flows to particular locations. In this example, the operator in this case peers its EPC with two other fixed operators. Routing through each peering point is handled by the respective P-GW-D1 and P-GW-D2 1603A, B. The dashed lines and arrows 1605 show traffic from a UE 1607 that needs to be routed to another peering operator. The flow rules and actions to distinguish which peering point the traffic should traverse are installed in the OpenFlow switches 1609 and gateways 1603A, B by the OpenFlow controller 1611. The OpenFlow controller 1611 calculates these flow rules and actions based on the routing tables it maintains for outside traffic, and the source and destination of the packets, as well as by any specialized forwarding treatment required for DSCP marked packets.

The long dash and dotted lines and arrows 1615 shows a example of a UE 1617 that is obtaining content from an external source. The content is originally not formulated for the UE's 1617 screen, so the OpenFlow controller 1611 has installed flow rules and actions on the P-GW-D1 1603B, S-GW-D 1619 and the OpenFlow switches 1609 to route the flow through a transcoding application 1621 in the cloud computing facility. The transcoding application 1621 reformats the content so that it will fit on the UE's 1617 screen. A PCRF requests the specialized treatment at the time the UE sets up its session with the external content source via the IP Multimedia Subsystem (IMS) or another signaling protocol.

GTP TEID Routing

In one embodiment, OpenFlow is modified to provide rules for GTP TEID Routing. FIG. 17 is a diagram of one embodiment of the OpenFlow flow table modification for GTP TEID routing. An OpenFlow switch that supports TEID routing matches on the 2 byte (16 bit) collection of header fields and the 4 byte (32 bit) GTP TEID, in addition to other OpenFlow header fields, in at least one flow table (e.g., the first flow table). The GTP TEID flag can be wildcarded (i.e. matches are "don't care"). In one embodiment, the EPC protocols do not assign any meaning to TEIDs other than as an endpoint identifier for tunnels, like ports in standard UDP/TCP transport protocols. In other embodiments, the TEIDs can have a correlated meaning or semantics. The GTP header flags field can also be wildcarded, this can be partially matched by combining the following bitmasks: 0xFF00—Match the Message Type field; 0xe0—Match the Version field; 0x10—Match the PT field; 0x04—Match the E field; 0x02—Match the S field; and 0x01—Match the PN field.

In one embodiment, OpenFlow can be modified to support virtual ports for fast path GTP TEID encapsulation and decapsulation. An OpenFlow mobile gateway can be used to support GTP encapsulation and decapsulation with virtual ports. The GTP encapsulation and decapsulation virtual ports can be used for fast encapsulation and decapsulation of user data packets within GTP-U tunnels, and can be designed simply enough that they can be implemented in hardware or firmware. For this reason, GTP virtual ports may have the following restrictions on traffic they will handle: Protocol Type (PT) field=1, where GTP encapsulation ports only support GTP, not GTP' (PT field=0); Extension Header flag (E)=0, where no extension headers are supported, Sequence Number flag (S)=0, where no sequence numbers are supported; N-PDU flag (PN)=0; and Message type=255, where Only G-PDU messages, i.e. tunneled user data, is supported in the fast path.

If a packet either needs encapsulation or arrives encapsulated with nonzero header flags, header extensions, and/or the GTP-U packet is not a G-PDU packet (i.e. it is a GTP-U control packet), the processing must proceed via the gateway's slow path (software) control plane. GTP-C and GTP' packets directed to the gateway's IP address are a result of mis-configuration and are in error. They must be sent to the OpenFlow controller, since these packets are handled by the S-GW-C and P-GW-C control plane entities in the cloud computing system or to the billing entity handling GTP' and not the S-GW-D and P-GW-D data plane switches.

GTP virtual ports are configured from the OpenFlow controller using a configuration protocol. The details of the configuration protocol are switch-dependent. The configuration protocol must support messages that perform the following functions: allow the controller to query for and return an indication whether the switch supports GTP fast path virtual ports and what virtual port numbers are used for fast path and slow path GTP-U processing; and allow the controller to instantiate a GTP-U fast path virtual port within a switch datapath for use in the OpenFlow table set-output-port action. The configuration command must be run in a transaction so that, when the results of the action are reported back to the controller, either a GTP-U fast path virtual port for the requested datapath has been instantiated or an error has returned indicating why the request could not be honored. The command also allows the OpenFlow controller to bind a GTP-U virtual port to a physical port. For decapsulation virtual ports, the physical port is an input port. For encapsulation virtual ports, the physical port is an output port.

The OpenFlow controller instantiates a virtual port for each physical port that may transmit or receive packets routed through a GTP tunnel, prior to installing any rules in the switch for GTP TEID routing.

In one embodiment, an OpenFlow GTP gateway maintains a hash table mapping GTP TEIDs into the tunnel header fields for their bearers. FIG. 18 is a diagram of the structure of a flow table row. The TEID hash keys are calculated using a suitable hash algorithm with low collision frequency, for example SHA-1. The gateway maintains one such flow table row for each GTP TEID/bearer. The TEID field contains the GTP TEID for the tunnel. The VLAN tags and MPLS labels fields contain an ordered list of VLAN tags and/or MPLS labels defining tunnels into which the packet needs to be routed. The VLAN priority bits and MPLS traffic class bits are included in the labels. Such tunnels may or may not be required. If they are not required, then these fields are empty. The tunnel origin source IP address contains the address on the encapsulating gateway to which any control traffic involving the tunnel should be directed (for example, error indications). The tunnel end destination IP address field contains the IP address of the gateway to which the tunneled packet should be routed, at which the packet will be decapsulated and removed from the GTP tunnel. The QoS DSCP field contains the DiffServe Code Point, if any, for the bearer in the case of a dedicated bearer. This field may be empty if the bearer is a default bearer with best effort QoS, but will contain nonzero values if the bearer QoS is more than best effort.

In one embodiment, slow path support for GTP is implemented with an OpenFlow gateway switch. An OpenFlow mobile gateway switch also contains support on the software control plane for slow path packet processing. This path is taken by G-PDU (message type 255) packets with nonzero header fields or extension headers, and user data plane packets requiring encapsulation with such fields or addition of extension headers, and by GTP-U control packets. For this purpose, the switch supports three local ports in the software control plane: LOCAL_GTP_CONTROL—the switch fast path forwards GTP encapsulated packets directed to the gateway IP address that contain GTP-U control messages and the local switch software control plane initiates local control plane actions depending on the GTP-U control message; LOCAL_GTP_U_DECAP—the switch fast path forwards G-PDU packets to this port that have nonzero header fields or extension headers (i.e. E!=0, S!=0, or PN!=0). These packets require specialized handling. The local switch software slow path processes the packets and performs the specialized handling; and LOCAL_GTP_U_ENCAP—the switch fast path forwards user data plane packets to this port that require encapsulation in a GTP tunnel with nonzero header fields or extension headers (i.e. E!=0, S!=0, or PN!=0). These packets require specialized handling. The local switch software slow path encapsulates the packets and performs the specialized handling. In addition to forwarding the packet, the switch fast path makes the OpenFlow metadata field available to the slow path software.

To support slow path encapsulation, the software control plane on the switch maintains a hash table with keys calculated from the GTP-U TEID. The TEID hash keys are calculated using a suitable hash algorithm with low collision frequency, for example SHA-1. The flow table entries contain a record of how the packet header, including the GTP encapsulation header, should be configured. This includes: the same header fields as for the hardware or firmware encapsulation table in FIG. 18; values for the GTP header flags (PT, E, S, and PN); the sequence number and/or the N-PDU number if any; if the E flag is 1, then the flow table contains a list of the extension headers, including their types, which the slow path should insert into the GTP header.

In one embodiment, the system implements a GTP fast path encapsulation virtual port. When requested by the S-GW-C and P-GW-C control plane software running in the cloud computing system, the OpenFlow controller programs the gateway switch to install rules, actions, and TEID hash table entries for routing packets into GTP tunnels via a fast path GTP encapsulation virtual port. The rules match the packet filter for the input side of GTP tunnel's bearer. Typically this will be a 4 tuple of: IP source address; IP destination address; UDP/TCP/SCTP source port; and UDP/TCP/SCTP destination port. The IP source address and destination address are typically the addresses for user data plane traffic, i.e. a UE or Internet service with which a UE is transacting, and similarly with the port numbers. For a rule matching the GTP-U tunnel input side, the associated instructions and are the following:

---
Write-Metadata ( GTP-TEID, 0xFFFFFFFF )
Apply-Actions (Set-Output-Port GTP-Encap-VP )
---

The switch also writes an entry in the TEID hash table containing the tunnel header fields for the packet. GTP-TEID is the GTP tunnel endpoint identifier. GTP-Enacap-VP is the GTP fast path encapsulation virtual port bound to the physical port out which the encapsulated packet will ultimately be routed.

When a packet header matches a rule associated with the virtual port, the GTP TEID is written into the lower 32 bits of the metadata and the packet is directed to the virtual port. The virtual port calculates the hash of the TEID and looks up the tunnel header information in the tunnel header table. If no such tunnel information is present, the packet is forwarded to the controller with an error indication. Otherwise, the virtual port constructs a GTP tunnel header and encapsulates the packet. Any DSCP bits or VLAN priority bits are additionally set in the IP or MAC tunnel headers, and any VLAN tags or MPLS labels are pushed onto the packet. The encapsulated packet is forwarded out the physical port to which the virtual port is bound.

In one embodiment, the system implements a GTP fast path decapsulation virtual port. When requested by the S-GW and P-GW control plane software running in the cloud computing system, the gateway switch installs rules and actions for routing GTP encapsulated packets out of GTP tunnels. The rules match the GTP header flags and the GTP TEID for the packet, in the modified OpenFlow flow table shown in FIG. 17 as follows: the IP destination address is an IP address on which the gateway is expecting GTP traffic; the IP protocol type is UDP (17); the UDP destination port is the GTP-U destination port (2152); and the header fields and message type field is wildcarded with the flag 0XFFF0 and the upper two bytes of the field match the G-PDU message type (255) while the lower two bytes match 0x30, i.e. the packet is a GTP packet not a GTP' packet and the version number is 1.

The virtual port simply removes the GTP tunnel header and forwards the enclosed user data plane packet out the bound physical port.

In one embodiment, the system implements handling of GTP-U control packets. The OpenFlow controller programs the gateway switch flow tables with 5 rules for each gateway switch IP address used for GTP traffic. These rules contain specified values for the following fields: the IP destination address is an IP address on which the gateway is expecting GTP traffic; the IP protocol type is UDP (17); the UDP destination port is the GTP-U destination port (2152); the GTP header flags and message type field is wildcarded with 0xFFF0; the value of the header flags field is 0x30, i.e. the version number is 1 and the PT field is 1; and the value of the message type field is one of 1 (Echo Request), 2 (Echo Response), 26 (Error Indication), 31 (Support for Extension Headers Notification), or 254 (End Marker).

The instruction associated with a match to one of these rules is:
Apply-Actions (Set-Output-Port LOCAL_GTP_CONTROL)
This causes the packet to be forwarded to the gateway switch's local GTP-U control port for processing by the local software control plane. GTP-U control packets that are originated by the switch are generated on the software control plane and are routed by the control plane.

In one embodiment, the system implements handling of G-PDU packets with extension headers, sequence numbers, and N-PDU numbers. G-PDU packets with extension headers, sequence numbers, and N-PDU numbers need to be forwarded to the local switch software control plane for processing. The OpenFlow controller programs 3 rules for this purpose. They have the following common header fields: the IP destination address is an IP address on which the gateway is expecting GTP traffic; and the IP protocol type is UDP (17); the UDP destination port is the GTP-U destination port (2152).

The header flags and message type fields for the three rules are wildcarded with the following bitmasks and match as follows: bitmask 0xFFF4 and the upper two bytes match the G-PDU message type (255) while the lower two bytes are 0x34, indicating that the version number is 1, the packet is a GTP packet, and there is an extension header present; bitmask 0xFFF2 and the upper two bytes match the G-PDU message type (255) while the lower two bytes are 0x32, indicating that the version number is 1, the packet is a GTP packet, and there is a sequence number present; and bitmask 0xFF01 and the upper two bytes match the G-PDU message type (255) while the lower two bytes are 0x31, indicating that the version number is 1, the packet is a GTP packet, and a N-PDU is present.

The instruction for these rules is the following:
Apply-Actions (Set-Output-Port LOCAL_GTP_U_DECAP)
This sends the packet to the software slow path GTP-U decapsulation path for special processing.

In one embodiment, the system implements handling of user data plane packets requiring GTP-U encapsulation with extension headers, sequence numbers, and N-PDU numbers. User data plane packets that require extension headers, sequence numbers, or N-PDU numbers during GTP encapsulation require special handling by the software slow path. For these packets, the OpenFlow controller programs a rule matching the 4 tuple: IP source address; IP destination address; UDP/TCP/SCTP source port; and UDP/TCP/SCTP destination port. The instructions for matching packets are:

---
Write-Metadata ( GTP-TEID, 0xFFFFFFFF )
Apply-Actions (Set-Output-Port LOCAL_GTP_U_ENCAP )
---

This sends the packet to the software slow path GTP encapsulation port and, in addition, makes the TEID available to the slow path.

The OpenFlow message programming the rule insertion also includes information on the values for the sequence number, N-PDU number, or the type and contents of the extension header, as well as the packet header fields designating the decapsulation gateway and bearer transport and the GTP TEID. This information is inserted by the switch's control plane software into the software encapsulation table, keyed by the TEID.

In one embodiment, the system implements handling of GTP-C and GTP' control packets. Any GTP-C and GTP' control packets that are directed to IP addresses on a gateway switch are in error. These packets need to be handled by the S-GW-C, P-GW-C, and GTP' protocol entities in the cloud computing system, not the S-GW-D and P-GW-D entities in the switches. To catch such packets, the OpenFlow controller must program the switch with the following two rules:

the IP destination address is an IP address on which the gateway is expecting GTP traffic; the IP protocol type is UDP (17); for one rule, the UDP destination port is the GTP-U destination port (2152), for the other, the UDP destination port is the GTP-C destination port (2123); the GTP header flags and message type fields are wildcarded.

These rules must be the lowest priority of all the GTP rules in the gateway switch's flow table. They will match any GTP packets that don't match other, more specific rules. The instruction for these rules is the following:

Apply-Actions (Set-Output-Port CONTROLLER)

This encapsulates the packet and sends it to the OpenFlow controller.

In one embodiment, the system implements non-gateway GTP routing. A GTP-extended Openflow switch can also accomplish GTP routing without performing the gateway functions of encapsulation and decapsulation. The GTP routing function can be performed by a gateway switch in addition to its gateway function, or it can be performed by another switch that lacks a gateway function, within the distributed EPC switching fabric.

A GTP-extended Openflow switch contains at least one flow table that handles rules matching the GTP header fields as in FIG. 17. The Openflow controller programs the GTP header field rules in addition to the other fields to perform GTP routing and adds appropriate actions if the rule is matched. For example, the following rule matches a GTP-C control packet directed to a control plane entity (MME, S-GW-C, P-GW-C) in the cloud computing system, which is not in the control plane VLAN: the VLAN tag is not set to the control plane VLAN, the destination IP address field is set to the IP address of the targeted control plane entity, the IP protocol type is UDP (17), the UDP destination port is the GTP-C destination port (2123), the GTP header flags and message type is wildcarded with 0xF0 and the matched version and protocol type fields are 2 and 1, indicating that the packet is a GTPv2 control plane packet and not GTP'.

The following actions push a control plane VLAN tag onto the packet and forward it to the cloud for processing by the relevant control plane entity. The packet is forwarded without any L3 processing (i.e. not modifying the IP TTL):

Write-Action ( Set-VLAN-ID CP_VLAN_TAG )
Write-Action ( Set-Source-MAC-Address SWITCH_MAC_ADDR )
Write-Action ( Set-Dest-MAC-Address NEXT_HOP_MAC_ADDR )
Set-Output-Port NEXT_HOP_PORT GTP Extensions for OpenFlow The OpenFlow protocol can be modified to provide extensions for GTP that enable the management of the EPC. OpenFlow utilizes data structures referred to as flow match structures that enable the protocol to define criteria for matching rules to particular flows. This can be accomplished with a non-standardized or standardized extensible match for GTP TEID.

First Embodiment

In one embodiment, the OpenFlow flow match structure of ofp_match, contains two fields, type and length, that allow the flow match structure to be extended. The type field can be set to the type of the extension and the length field can be set to the length of the extended ofp_match structure. In one embodiment, a new type based on a random number for GTP flow matching is defined:

```
enum ofp_match_type_ext {
    ERSMT_GTP = 48696,
};
```

The type can be randomly generated so as not to interfere with other extended types. There is currently no organizational mechanism to register type identifiers in OpenFlow.

The ersmt_gtp structure defines the flow table fields for GTP flow routing as:

```
struct ersmt_gtp {
    unit8_t gtp_wildcard;
    uint16_t gtp_type_n_flags;
    uint16_t gtp_flag_mask;
    uint32_t gtp_teid;
};
```

The gtp_type_n flags field contains the GTP message type in the upper 8 bits and the GTP header flags in the lower 8 bits. The gtp_teid field contains the GTP TEID. The gtp_wildcard field indicates whether the GTP type and flags and TEID should be matched. If the lower four bits are 1, the type and flags field should be ignored, while if the upper four bits are 1, the TEID should be ignored. If the lower bits are 0, the type and fields flag should be matched subject to the flags in the gtp_flag_mask field, while if the upper bits are 0 the TEID should be matched. The mask is combined with the message type and header field of the packet using logical AND; the result becomes the value of the match. Only those parts of the field in which the mask has a 1 value are matched.

Second Embodiment

Figure 22:
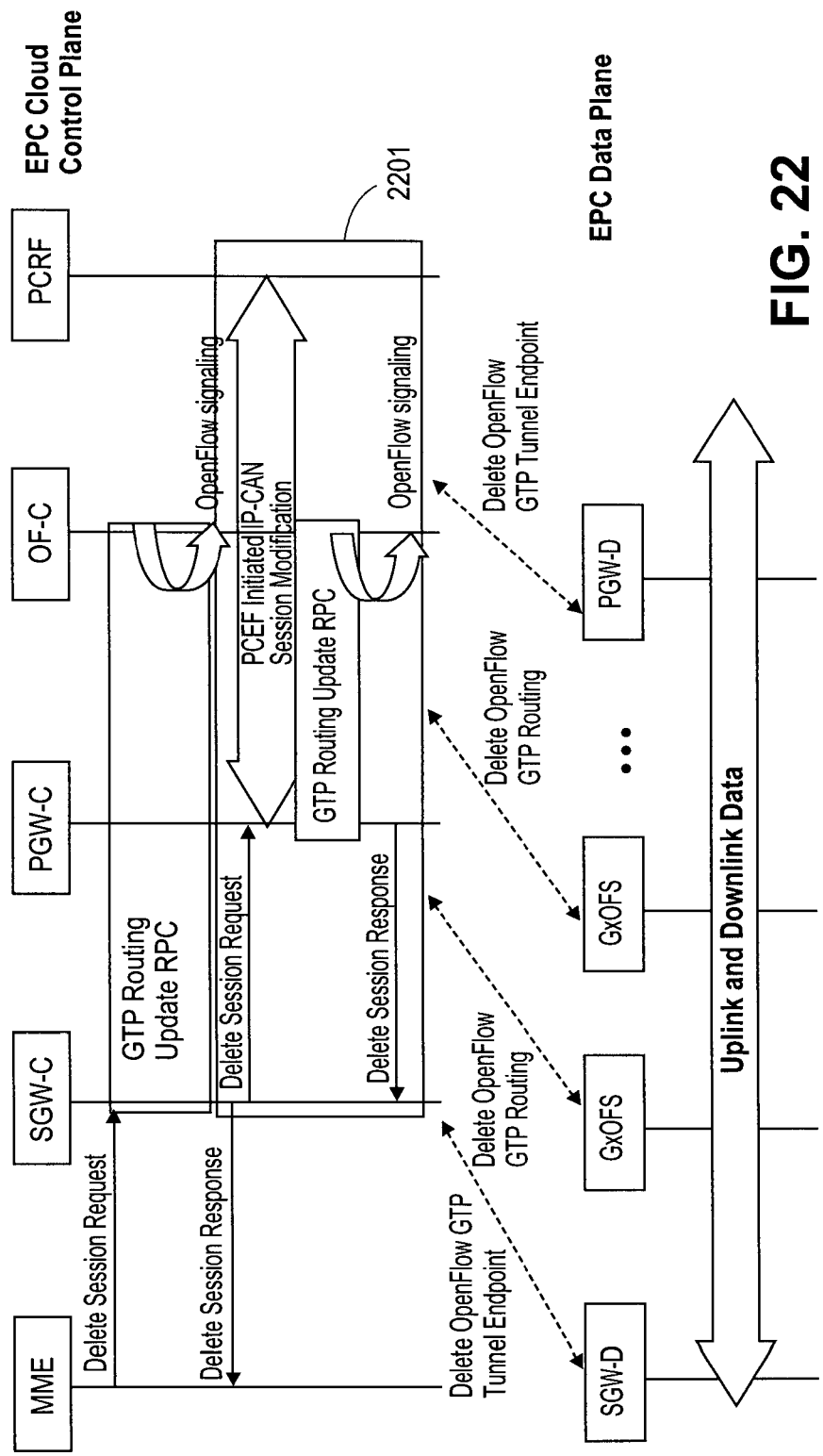
FIG. 22 is a diagram of one embodiment of the OpenFlow message sequence for the delete session request procedure

In another embodiment, OpenFlow 1.2 supports an extensible match structure, OXM, shown in FIG. 22, in which the flow match is encoded as a type-length-value. The oxm_class field values 0x0000 to 0x7FFF are reserved for Open Network Foundation members, 0x8000 to 0xFFFE are reserved for future standardization, and 0xFFFF is designated for experimentation. The oxm_field identifies a sub-type within the class, the HM field specifies whether the value contains a bitmask (yes=1, no=0), and oxm_length contains the length of the value payload.

For GTP TEID routing, we define a value payload by the ersmt_gtp_match structure:

```
struct ersmt_gtp_match {
    uint16_t gtp_type_n_flags;
    uint32_t gtp_teid;
};
```

The gtp_type_n flags field contains the GTP message type in the upper 8 bits and the GTP header flags in the lower 8 bits. The gtp_teid field contains the GRP TEID. When the value of the oxm_type (oxm_class+oxm_field is GTP_MATCH and the HM bit is zero, the flow's GTP header must match these values exactly. If the HM flag is one, the value contains an ersmt_gtp_match field and an ermst_gtp_mask field, as specified by the OpenFlow 1.2 specification. We define ermst_gtp_mask field for selecting flows based on the settings of flag bits:

```
struct ermst_gtp_mask {
    uint32_t gtp_wildcard;
    uint16_t gtp_flag_mask;
};
```

The gtp_wildcard field indicates whether the TEID should be matched. If the value is 0xFFFFFFFF, the TEID should be matched and not the flags, if the value is 0x00000000, the flags should be matched and not the TEID. If the gtp_wildcard indicates the flags should be matched, the gtp_flag_mask is combined with the message type and header field of the packet using logical AND, the result becomes the value of the match. Only those parts of the field in which the mask has a 1 value are matched.

In addition to the flow table fields, an object is required to encode the encapsulation of the virtual port TEID hash table entry. The ersmt_gtp_tuninfo structure can be used to define this information:

```
struct ermst_mpls_lbl {
    uint8_t mpls_lbl_low;
    uint8_t mpls_lbl_mid;
    uint8_t mpls_lbl_high;
};
struct ersmt_gtp_tuninfo {
    uint16_t gtp_tuninfo_length;
    uint32_t gtp_tuninfo_saddr;
    uint32_t gtp_tuninfo_daddr;
    uint8_t gtp_tuninfo_dscp;
    uint8_t gtp_tuninfo_vlan_len;
    unit16_t gtp_tuninfo_vlan_tags[0]; /*variable length*/
    uint8_t gtp_tuninfo_mpls_len;
    struct mpls_lbl gtp_tuninfo_mpls_labels[0]; /*variable length*/
};
```

The ermst_mpls_lbl struct provides a 24 bit data structure for encoding MPLS labels. The ersmt_gtp_tunifo structure contains fields describing a GTP tunnel. These are inserted into the encapsulation virtual port. The structure is variable length because it may contain a variable number of VLAN tags and/or MPLS labels. The gtp_tuninfo_length field contains the length of the structure. The gtp_tuninfo_saddr, gtp_tuninfo_daddr, and gtp_tuninfo_dscp fields contain the source address of the tunnel (the address of the interface on the switch performing the encapsulation), the destination address of the tunnel (the switch to which the tunneled packet will be routed and that will decapsulate the packet), and the DiffServ Code Point (if any) assigned to the tunnel's bearer. The bearer DSCP will be nonzero if the bearer is a dedicated bearer and it is not a best effort bearer.

The gtp_tuninfo_vlan_len and gtp_tuninfo_mpls_len contain the length of the VLAN tags field and the MPLS labels field, respectively. The gtp_tuninfo_vlan_tags[0] and gtp_tuninfo_mpls_labels[0] fields contain the actual VLAN tags and/or the MPLS labels that need to be pushed onto the packet's tunnel header. These fields will be absent (and the corresponding length fields will be zero) if no VLAN or MPLS Label Switched Paths (LSPs) are used for the tunnel.

In one embodiment, OpenFlow is modified to add extension messages for adding, deleting, or modifying an EPC bearer or GTP tunnel. The OpenFlow signaling for adding, modifying, or deleting an EPC bearer or GTP tunnel consists of one OpenFlow message, the ofp_flow_mod message, containing an ersmt_gtp GTP flow definition. The standard OpenFlow ofp_flow_mod message can be used as long as the OpenFlow protocol parser can handle extended flows. If the flow modification requires a change to the encapsulation virtual port TEID hash table, the OpenFlow controller must issue a GTP OpenFlow extension message containing the TEID hash table entry. The OpenFlow controller must issue both messages sequentially, the ofp_flow_mod message first, then the TEID hash table modification message, then the OpenFlow controller must issue an OFPT_BARRIER_REQUEST message to force processing of both messages by the OpenFlow switch.

The OpenFlow message extension header structure ofp_experimenter_header contains an experimenter id field, called experimenter. In one embodiment, this field can be set to the Ericsson IEEE OUI, 0x01ec or similar manufacturer or provider OUI. The rest of the structure contains the GTP extension messages. These messages can be identified by the following message codes:

```
enum ermst_gtp_message_code {
    GTP_ADD_TEID_TABLE_ENTRY = 0,
    GTP_DEL_TEID_TABLE_ENTRY = 1,
};
```

The GTP OpenFlow extension contains a message for adding and for deleting a TEID hash table entry. Entries are modified by first deleting the entry for the TEID then adding a new entry for the same TEID. The GTP OpenFlow extension message for entering a new TEID entry in the encapsulation virtual port hash table is:

```
struct ermst_teid_table_add {
    ermst_gtp_message_code teid_table_add_type;
    uint16_t teid_table_add_teid;
    struct ermst_gtp_tuninfo teid_table_add_entry;
};
```

The teid_table_add_type field is set to GTP_ADD_TEID_TABLE_ENTRY while the teid_table_add_teid field contains the TEID and the teid_table_add_entry contains the table entry to be added. The GTP OpenFlow extension message for deleting a TEID entry from the encapsulation virtual port hash table is:

```
struct ermst_teid_table_del {
    ermst_gtp_message_code teid_table_del_type;
    uint16_t teid_table_del_teid;
};
```

The teid_table_del_type field is set to GTP_DEL_TEID_TABLE_ENTRY while the teid_table_del_teid field contains the TEID for the entry to be deleted.

In one embodiment, the extensions to OpenFlow for GTP also encompass OpenFlow switch configuration. Prior to accepting any GTP routing update RPCs from EPC cloud control plane entities, the OpenFlow controller must configure GTP encapsulation and/or decapsulation virtual ports on the GTP extended OpenFlow gateway switches. The configuration is accomplished using a switch-specific configuration protocol, and is described above.

In addition to virtual port configuration on the GTP extended OpenFlow gateways, QoS queue configuration may be required on any OpenFlow switch that will be forwarding better than best effort GTP bearer traffic. The OpenFlow protocol contains no messages for configuring queues, this configuration is left up to the configuration protocol, as is the case with virtual ports. Prior to installing any flow routes, the OpenFlow controller must configure any queues to connect with physical and/or virtual ports in switches that will route better than best effort GTP bearers. This configuration step must be done both for GTP extended OpenFlow switches and standard OpenFlow switches.

In one embodiment OpenFlow message flows for GTP operations are modified. As described above, the EPC control plane entities, including the EPC control plane parts of the SGW and PGW, the SGW-C and PGW-C, reside in a cloud computing facility at a data center. The SGW-C and PGW-C communicate via remote procedure calls (RPCs) or similar mechanism with the OpenFlow controller within the cloud when routing changes are triggered by the GTP signaling. The OpenFlow controller enacts the changes on the data plane to GTP extended OpenFlow enabled data plane gateways, the SGW-C and PGW-C, and to OpenFlow switches that are extended for GTP routing, referred to herein as 'GxOFS,' through OpenFlow signaling on the control plane network connecting the cloud to the gateways and switches.

In general, no signaling is required to the GxOFS if no special routing treatment is required for GTP flows. Cases where such treatment might be required are, for example: where a GTP bearer that is being established that is a better than best effort bearer and the traffic class requires specialized QoS treatment of the bearer traffic on intermediate switches (i.e. not just on gateways); where the operator's EPC has peering points with the Internet at more than one point and consequently has more than one gateway, routing to the optimal gateway may require steering traffic within the EPC at intermediate switches; and where the GTP flow must receive special treatment from an application somewhere within the operator's network, for example, within the cloud. An example of such special treatment is transcoding. The intermediate switches may require programming to route the user plane packets to the transcoding application. This list is not exhaustive, many other applications of GTP routing on intermediate switches are possible.

Bearers and GTP tunnels can be set up using the GTP-C create session request messages. This procedure is used in a variety of message sequences, for example, in an E-UTRAN initial attach procedure.

Figure 20:
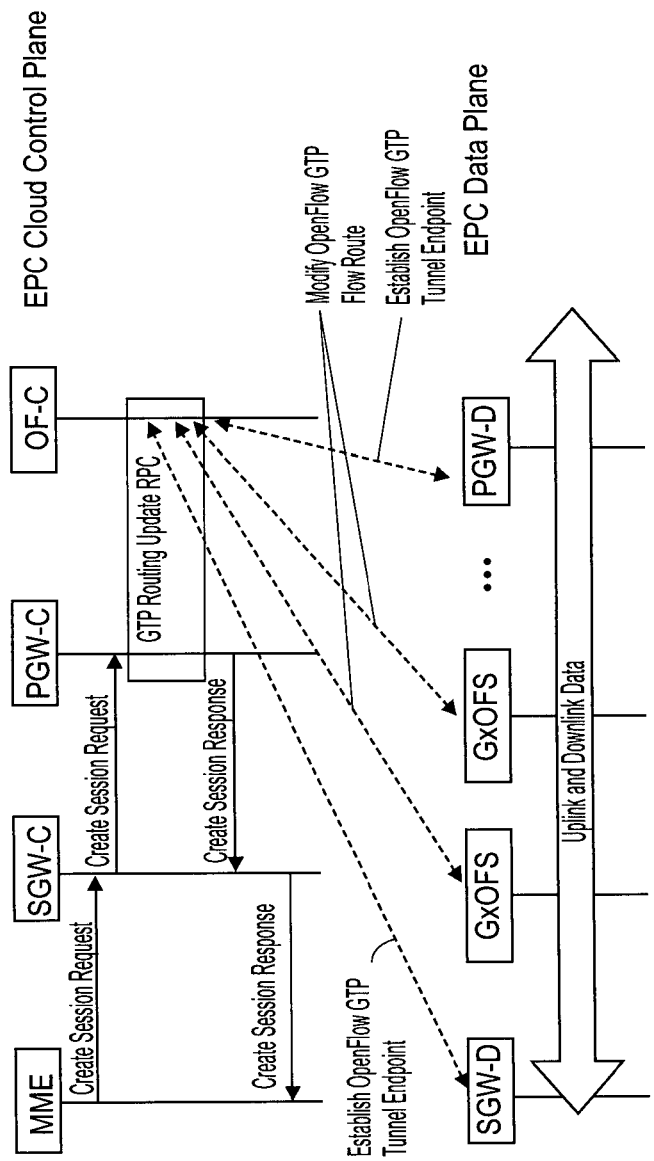
FIG. 20 is a diagram of one embodiment of an OpenFlow message flow for the create session request procedure.

In FIG. 20, an example of the OpenFlow message flows for the create session request procedure are shown. In the illustrated example, the MME sends a create session request to the SGW-C in the cloud computing system, which then sends the request to the PGW-C. The PGW-C calls into the OpenFlow controller through a GTP routing update RPC call, requesting that the OpenFlow controller establish a new GTP tunnel endpoint at the SGW-D and PGW-C, and to install routes for the new GTP bearer or tunnel on intermediate switches, if necessary.

Before returning a result to the PGW-C from the GTP routing update RPC, the OpenFlow controller issues a sequence of OpenFlow messages to the appropriate data plane gateway entity. In the example embodiment, the sequence begins with an OFP_BARRIER_REQUEST to ensure that there are no pending messages that might influence processing of the following messages. Then an OFPT_FLOW_MOD message is issued, including the ofp_match structure with GTP extension as the match field and OFPFC_ADD as the command field. The message specifies actions and instructions, as described above, to establish a flow route for the GTP tunnel that encapsulates and decapsulates the packets through the appropriate virtual port. In addition, immediately following the OFPT_FLOW_MOD message, the OpenFlow controller issues an GTP_ADD_TEID_TABLE_ENTRY message to the gateways containing the TEID hash table entries for the encapsulation virtual port. As described above, the two OpenFlow messages are followed by an OFPT_BARRIER_REQUEST message to force the gateways to process the flow route and TEID hash table update before proceeding.

Prior to returning from the GTP routing update RPC, the OpenFlow controller also issues GTP flow routing updates to any GTP extended OpenFlow Switches (GxOFSs) that need to be involved in customized GTP flow routing. The messages in these updates consist of an OFP_BARRIER_REQUEST followed by an OFPT_FLOW_MOD message containing the ofp_match structure with GTP extension for the new GTP flow as the match field and OFPFC_ADD as the command field, and the actions and instructions described above for customized GTP flow routing. A final OFP_BARRIER_REQUEST forces the switch to process the change before responding. The flow routes on any GxOFSs are installed after installing the GTP tunnel endpoint route on the SGW-D and prior to installing the GTP tunnel endpoint route on the PGW-D, as illustrated in FIG. 19. The OpenFlow controller does not respond to the PGW-C RPC until all flow routing updates have been accomplished.

Once the RPCs have returned, the PGW-C and SGW-C return create session response messages. When the MME receives such a response, it can signal the ENodeB with the initial context setup request or attach accept message indicating that the UE is free to start using the bearer or tunnel.

Characteristics of the GTP bearer are changed using a modify bearer request procedure. Such changes may, for example, include the QoS assigned to the IP packets. This procedure is used in a variety of EPC message sequences, for example, a UE triggered service request.

Figure 21:
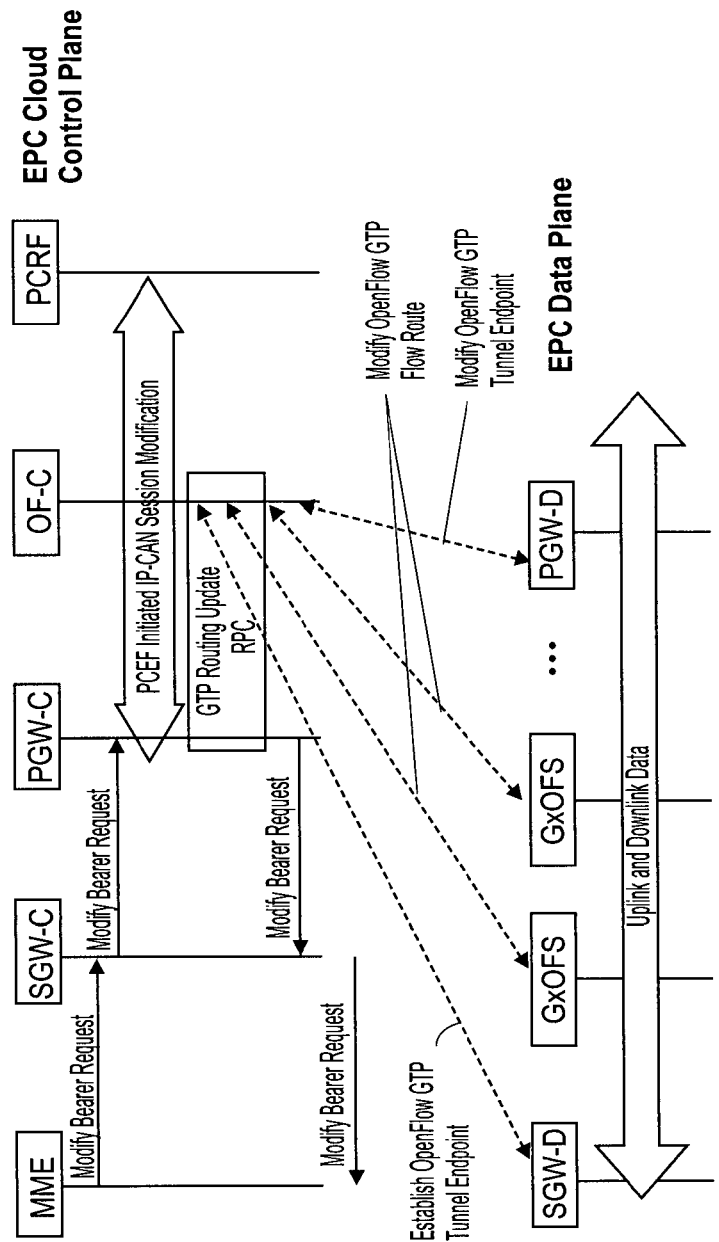
FIG. 21 is a diagram of one embodiment of the OpenFlow message sequence for the modify bearer request procedure.

FIG. 21 is a diagram of one embodiment of the OpenFlow message sequence for the modify bearer request procedure. As with session creation, the EPC cloud control plane MME issues a modify bearer request message to the SGW-C and the SGW-C issues a modify bearer request message to the PGW-C. The PGW-C then optionally begins a policy and charging enforcement function (PCEF) initiated Internet Protocol connectivity access network (IP-CAN) session modification process with the PCRF. When this process completes, the PGW-C issues a GTP routing update RPC to the OpenFlow controller including the new bearer update information. The OpenFlow controller then issues GTP extended OpenFlow messages to the SGW-D, GxOFSes, and the PGW-D.

Before returning a result to the PGW-C from the GTP routing update RPC, the OpenFlow controller issues a sequence of OpenFlow messages to the appropriate data plane gateway entity. The sequence begins with an OFP_BARRIER_REQUEST to ensure that there are no pending messages that might influence processing of the following messages. Then an OFPT_FLOW_MOD message is issued, including the ofp_match structure with GTP extension as the match field and OFPFC_MODIFY or OFPFC_MODIFY_STRICT as the command field. If necessary, the message specifies actions and instructions, as described above, to establish a new flow route for the GTP tunnel that encapsulates and decapsulates the packets through the appropriate virtual port. In addition, if changes are required in the TEID hash table, immediately following the OFPT_FLOW_MOD message, the OpenFlow controller issues a TP_DEL_TEID_TABLE_ENTRY to delete the entry followed by a TP_ADD_TEID_TABLE_ENTRY message to install the new entry. As described above, the two OpenFlow messages are followed by an OFPT_BARRIER_REQUEST message to force the gateways to process the flow route and TEID hash table update before proceeding.

Prior to returning from the GTP routing update RPC, the OpenFlow controller also issues necessary GTP flow routing updates to any GTP extended OpenFlow Switches (Gx-OFSs) that need to be involved in customized GTP flow routing. The messages in these updates consist of an OFP_BARRIER_REQUEST followed by an OFPT_FLOW_MOD message containing the ofp_match structure with GTP extension for the new GTP flow as the match field and OFPFC_MODIFY or OFPFC_MODIFY_STRICT as the command field, and, if necessary, the actions and instructions, as described above, for customized GTP flow routing. A final OFP_BARRIER_REQUEST forces the switch to process the change before responding. The flow routes on any GxOFSs are installed after installing the GTP tunnel endpoint route on the SGW-D and prior to installing the GTP tunnel endpoint route on the PGW-D, as illustrated in FIG. 21. The OpenFlow controller does not respond to the PGW-C RPC until all flow routing updates have been accomplished. Once the RPCs have returned, the PGW-C and SGW-C return modify bearer response messages.

GTP bearers are deleted using the delete session request procedure. This procedure can be used in a variety of EPC message sequences, for example, a UE triggered detach request. FIG. 22 is a diagram of one embodiment of the OpenFlow message sequence for the delete session request procedure. In FIG. 22, two different message sequences are shown. If an idle mode signaling reduction (ISR) is on, the SGW-C calls into the OpenFlow controller with a GTP routing update RPC to the OpenFlow controller. In this case, the PGW-C is not involved in the signaling. If the ISR is not on, then the SGW-C sends the delete session request to the PGW-C. The PGW-C optionally conducts a PCEF initiated IP-CAN session termination process with the PCRF, then issues the GTP routing update RPC to the OpenFlow controller. When the GTP routing update RPC returns, the PGW-C issues a delete session reply to SGW-C. This sequence is shown in the box 2201 in FIG. 22. In either case, the OpenFlow signaling is conducted prior to returning the GTP Routing Update RPC to the calling party.

The OpenFlow message sequence issued by the OpenFlow controller to delete a session is as follows. The sequence begins with an OFP_BARRIER_REQUEST to ensure that there are no pending messages that might influence processing of the following messages. Then an OFPT_FLOW_MOD message is issued, including the ofp_match structure with GTP extension as the match field and OFPFC_DELETE or OFPFC_DELETE_STRICT as the command field. In addition, immediately following the OFPT_FLOW_MOD message, the OpenFlow controller issues a GTP_DEL_TEID_TABLE_ENTRY to delete the TEID hash table entry. As described above, the two OpenFlow messages are followed by an OFPT_BARRIER_REQUEST message to force the gateways to process the flow route and TEID hash table update before proceeding.

Prior to returning from the GTP routing update RPC, the OpenFlow controller also issues necessary GTP flow routing updates to any GTP extended OpenFlow Switches that need to be involved in customized GTP flow routing. The messages in these updates consist of an OFP_BARRIER_REQUEST followed by an OFPT_FLOW_MOD message containing the ofp_match structure with GTP extension for the new GTP flow as the match field and OFPFC_DELETE or OFPFC_DELETE_STRICT as the command field. A final OFP_BARRIER_REQUEST forces the switch to process the change before responding. The flow routes on any GxOFSs are installed after installing the GTP tunnel endpoint route on the SGW-D and prior to installing the GTP tunnel endpoint route on the PGW-D, as illustrated in FIG. 21. The OpenFlow controller does not respond to the calling entity until all flow routing updates have been accomplished.

Alternate Implementations

In other embodiments, the split EPC architecture can be implemented in non-cloud and non-virtualized systems. The control plane entities of the EPC architecture can be stored and executed on a single server or distributed across any number of servers or similar computing devices. Similarly, the control plane entities can be executed as standard software code and modules without virtualization or similar systems. These control plane entities can communicate with one another through local system or procedure calls, remote procedure calls or similar mechanisms. In further embodiments, a subset of the control plane entities can be virtualized or executed in a cloud computing system while another subset of the control plane entities can be executed in a server, distributed server system or similar system. The control plane entities can communicate with the data plane through the use of the OpenFlow protocol as described herein above or through other control protocols as described herein below.

The cloud computing system described herein above is provided by way of example and not by way of limitation. One skilled in the art would understand that the principles and features described above in relation to the cloud computing system can also be implemented in other configurations such as single servers or distributed server systems. Similar principles and features to those described above can be implemented in single server systems, distributed server systems and similar computing environments. These principles and features can also be implemented using a non-virtualized environment including non-virtualized control plane entities that are executed in any combination of cloud computing systems, single servers, distributed server systems and similar systems.

In other embodiments, other control protocols can be utilized in place of OpenFlow as described herein. The use of OpenFlow is presented by way of example and not limitation. Other control protocols can also be utilized to manage the communication between the control plane and data plane and configuration of the data plane of the split EPC architecture. An example of such a protocol is FORCES, an IETF standard protocol for splitting the control plane and forwarding plane in networks. The FORCES protocol specification is described in RFC 5810. RFC 5812 describes the architecture of a FORCES forwarding element, the equivalent of an OpenFlow switch. The FORCES protocol itself does not directly support programming routes into the forwarding element, it is, instead, a framework for handling the interaction between the FORCES controller and a FORCES forwarding element. The forwarding element architecture describes how to design the protocol that actually allows a FORCES controller to program a FORCES forwarding element. One skilled in the art would understand that a FORCES based system could include features described herein above in relation to the OpenFlow embodiment, such as the GTP OpenFlow extension, to allow the controller to program the switches for GTP TEID routing.

FORCES and OpenFlow are provided by way of example and not limitation. One skilled in the art would understand that the principles and features described above in relation to the FORCES and OpenFlow protocols can also be implemented in other similar control protocols.

MTU Fragmentation

Some Ipv4 networks fragment packets if the packet size is larger than the maximum transmission unit (MTU). Since fragments of such packets won't contain the GTP header, fragmented packets need to be reassembled by the Open-Flow GTP switch before processing through the forwarding table. This fragmentation and reassembly can utilize any fragmentation process or technique.

Thus, a method, system and apparatus for implementing an EPC in a cloud computing system has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for implementing a control plane of a core network of a communications network including a set of access networks each connected to the core network, the control plane implemented in a cloud computing system, the cloud computing system including a cloud manager and a controller, the controller to execute a plurality of control plane modules, the control plane to communicate with a data plane of the core network implemented in a plurality of network elements of the core network through a control protocol, the core network with the control plane implemented in the cloud computing system utilizing resources more efficiently than an architecture with the control plane implemented in the plurality of network elements of the core network, the method comprising the steps of:
   initializing the plurality of control plane modules of the core network within the controller, each control plane module in the plurality of control plane modules initialized as a separate virtual machine by the cloud manager, each control plane module to provide a set of control plane functions for managing the data plane;
   monitoring, by the cloud manager, resource utilization of each control plane module and the control plane traffic handled by each control plane module;
   detecting, by the cloud manager, a threshold level of resource utilization or traffic load for one of the plurality of control plane modules of the core network;
   initializing a new control plane module as a separate virtual machine by the cloud manager in response to detecting the threshold level, the new control plane module to share the load of the one of the plurality of control plane modules;
   signaling the plurality of network elements in the data plane to establish flow rules and actions to establish differential routing of flows in the data plane using the control protocol, wherein the control protocol is an Open Flow protocol, and wherein flow matches are encoded using an extensible match structure in which a flow match is encoded as a type-length-value (TLV); and
   configuring, by the controller, each network element in the plurality of network elements to extend an Open-Flow table to include a general packet radio service (GPRS) tunneling protocol (GTP) header and GTP tunnel endpoint identifier to support forwarding of GTP session flows.

2. The method of claim 1, further comprising the steps of:
   detecting a failure of the one of the plurality of control plane modules by the cloud manager; and
   restarting the one of the plurality of control plane modules by the cloud manager, in response to detecting the failure.

3. The method of claim 1, wherein the TLV includes an oxm-class field, an oxm_field to identify a subtype within a class, an HM field to specify whether a value contains a bitmask and an oxm_length field to specify a length of a value payload.

4. The method of claim 3, wherein the core network is a part of a fixed mobile network of a first operator, and wherein the signaling establishes a peering point with a second operator of a second fixed mobile network.

5. The method of claim 3, wherein the signaling establishes a routing of data from an external source requested by an end user device to a processing module in the cloud computing system, the processing module to process the data from the external source before forwarding the processed data to the end user device.

6. The method of claim 3, further comprising:
   establishing a general packet radio service (GPRS) tunneling protocol (GTP) a GTP session across the core network by the controller in response to a session request from an end user device by signaling each network element to forward the GTP session in the plurality of network elements using an extension of the Open Flow protocol.

7. The method of claim 6, further comprising:
   modifying a route of the GTP session across the core network, by the controller, by signaling each of the network elements currently forwarding the GTP session and each of the network elements on a new route for the GTP session using an extension of the Open-Flow protocol.

8. The method of claim 6, wherein the GTP session is any one of a GTP-U, GTP-C, or GTP' session.

9. The method of claim 1, further comprising:
   configuring, by the controller, a network element in the plurality of network elements to provide a virtual port for encapsulating or decapsulating into a general packet radio service (GPRS) tunneling protocol (GTP) GTP tunnel.

10. A cloud computer system for implementing a control plane of a core network of a communications network including a set of access networks each connected to the core network, the control plane to communicate with a data plane of the core network implemented in a plurality of network elements of the core network through a control protocol, the core network with the control plane implemented in the cloud computing system utilizes resources more efficiently than an architecture with the control plane implemented in the plurality of network elements of the core network, the cloud computing system, comprising:
   a controller configured to execute a plurality of control plane modules of the core network, each control plane module configured to provide a set of control plane functions for managing the data plane and to signal the plurality of network elements in the data plane to establish flow rules and actions to establish differential routing of flows in the data plane using the control protocol, wherein the control protocol is an OpenFlow protocol, and wherein flow matches are encoded using an extensible match structure in which a flow match is encoded as a type-length-value (TLV); and
   a cloud manager communicatively coupled to the controller, the cloud manager configured to:
   initialize each of the plurality of control plane modules within the controller as a separate virtual machine, monitor resource utilization of each control plane module and the control plane traffic handled by each control plane module,
detect whether a threshold level of resource utilization or traffic load has been reached by any of the plurality of control plane modules of the core network, and
initialize a new control plane module as a separate virtual machine in response to detecting the threshold level, the new control plane module to share the load of the one of the plurality of control plane modules that exceeded the threshold level,
wherein the controller configures each network element in the plurality of network elements to extend an Open Flow table to include a general packet radio service (GPFS) tunneling protocol (GTP) header and GTP tunnel endpoint identifier to support forwarding of GTP session flows.

11. The system of claim 10, wherein the plurality of control plane modules of the core network establish and manage general packet radio service (GPRS) tunneling protocol (GTP) sessions in the core network.

12. The system of claim 10, wherein the TLV includes an oxm-class field, an oxm_field to identify a subtype within a class, an HM field to specify whether a value contains a bitmask and an oxm_length field to specify a length of a value payload.

13. The system of claim 10, wherein the cloud manager is also to detect a failure of any of the plurality of control plane modules and restart the failed one of the plurality of control plane modules.

14. The system of claim 13, wherein the core network is a part of a fixed mobile network of a first operator, and wherein the controller's signals establish a peering point with a second operator of a second fixed mobile network.

15. The system of claim 13, wherein the controller establishes a routing of data from an external source requested by an end user device to a processing module in the cloud computing system, further comprising:
the processing module to process the data from the external source before forwarding the processed data to the end user device.

16. The system of claim 12, wherein the controller establishes a general packet radio service (GPRS) tunneling protocol (GTP) a GTP session across the core network by the controller in response to a session request from an end user device by signaling each network element to forward the GTP session in the plurality of network elements using an extension of the Open Flow protocol.

17. The system of claim 15, wherein the controller modifies a route of the GTP session across the core network by signaling each of the network elements currently forwarding the GTP session and each of the network elements to forward the GTP session using an extension of the Open-Flow protocol.

18. The system of claim 16, wherein the GTP session is any one of a GTP-U, GTP-C, or GTP' session.

19. The system of claim 10, wherein the controller configures a network element in the plurality of network elements to provide a virtual port for encapsulating or decapsulating into a general packet radio service (GPRS) tunneling protocol (GTP) GTP tunnel.

* * * * *